United States Patent
Cheng et al.

(10) Patent No.: US 12,198,546 B1
(45) Date of Patent: Jan. 14, 2025

(54) CONTEXT BASED ALERT FILTERING USING RANKED RISK FROM VEHICLE EVENTS AND/OR AN ACCIDENT DATABASE

(71) Applicant: Lytx, Inc., San Diego, CA (US)

(72) Inventors: Dennis Cheng, Bellevue, WA (US); Daniel Witriol, Kirkland, WA (US)

(73) Assignee: Lytx, Inc., San Diego, CA (US)

( * ) Notice: Subject to any disclaimer, the term of this patent is extended or adjusted under 35 U.S.C. 154(b) by 305 days.

(21) Appl. No.: 17/491,295

(22) Filed: Sep. 30, 2021

(51) Int. Cl.
 *G08G 1/0967* (2006.01)
 *G08G 1/01* (2006.01)
 *H04W 4/02* (2018.01)
 *H04W 4/40* (2018.01)

(52) U.S. Cl.
 CPC ..... *G08G 1/096775* (2013.01); *G08G 1/0141* (2013.01); *G08G 1/096733* (2013.01); *H04W 4/025* (2013.01); *H04W 4/40* (2018.02)

(58) Field of Classification Search
 CPC ........... G08G 1/096775; G08G 1/0141; G08G 1/096733; H04W 4/025
 See application file for complete search history.

(56) References Cited

U.S. PATENT DOCUMENTS

| | | | | |
|---|---|---|---|---|
| 6,111,521 A | * | 8/2000 | Mulder ............ | G08G 1/096775 340/995.13 |
| 12,054,141 B2 | * | 8/2024 | You ....................... | B60W 30/08 |
| 2005/0033504 A1 | | 2/2005 | Rennels | |
| 2006/0158330 A1 | | 7/2006 | Gueziec | |
| 2011/0077853 A1 | * | 3/2011 | Ranford ............. | G01C 21/3423 701/533 |
| 2013/0116919 A1 | | 5/2013 | Furuhata | |
| 2013/0210342 A1 | * | 8/2013 | Tanaka .................... | H04W 4/02 455/39 |
| 2014/0032094 A1 | | 1/2014 | Heinrichs-Bartscher | |
| 2016/0081575 A1 | * | 3/2016 | Wu ........................ | A63F 13/332 600/301 |
| 2016/0117921 A1 | * | 4/2016 | D'Amato ............... | G07C 5/008 701/117 |
| 2016/0232785 A1 | * | 8/2016 | Wang ................... | G08G 1/0129 |
| 2016/0232793 A1 | * | 8/2016 | Morishita ............ | G08G 5/0043 |
| 2016/0342850 A1 | * | 11/2016 | Elimalech ............ | G08G 1/0141 |
| 2017/0268896 A1 | | 9/2017 | Bai | |
| 2017/0276495 A1 | | 9/2017 | Krishnan | |
| 2019/0004525 A1 | | 1/2019 | Bills | |
| 2020/0353945 A1 | | 11/2020 | Thompson | |
| 2022/0005352 A1 | * | 1/2022 | Sakamoto ............. | B60Q 9/008 |
| 2022/0277648 A1 | | 9/2022 | Hagihara | |
| 2023/0093042 A1 | | 3/2023 | Cot | |
| 2023/0137142 A1 | * | 5/2023 | Blume ................. | G08G 1/0141 340/905 |

* cited by examiner

*Primary Examiner* — Sohana Tanju Khayer

(74) *Attorney, Agent, or Firm* — Van Pelt, Yi & James LLP

(57) ABSTRACT

A system for context based alert filtering using ranked risk from vehicle events and/or an accident database includes an interface and a processor. The interface is configured to receive a location of a translating object. The processor is configured to trigger a warning to the translating object based at least in part on its location and the existence of an associated hazard, wherein a secondary condition distinct from the hazard is used to determine relevance of the hazard.

25 Claims, 15 Drawing Sheets

CONTEXT BASED ALERT FILTERING USING RANKED RISK FROM VEHICLE EVENTS AND/OR AN ACCIDENT DATABASE

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of an anomalous event (e.g., a sudden stop, a hard maneuver, a collision, etc.). A vehicle event recorder with modern hardware is typically able to create warnings based on sensor information. However, this creates a problem in that direct information from sensors does not always encompass all that is known for creating a warning of risk to a driver.

BRIEF DESCRIPTION OF THE DRAWINGS

Various embodiments of the invention are disclosed in the following detailed description and the accompanying drawings.

DETAILED DESCRIPTION

Figure 1:
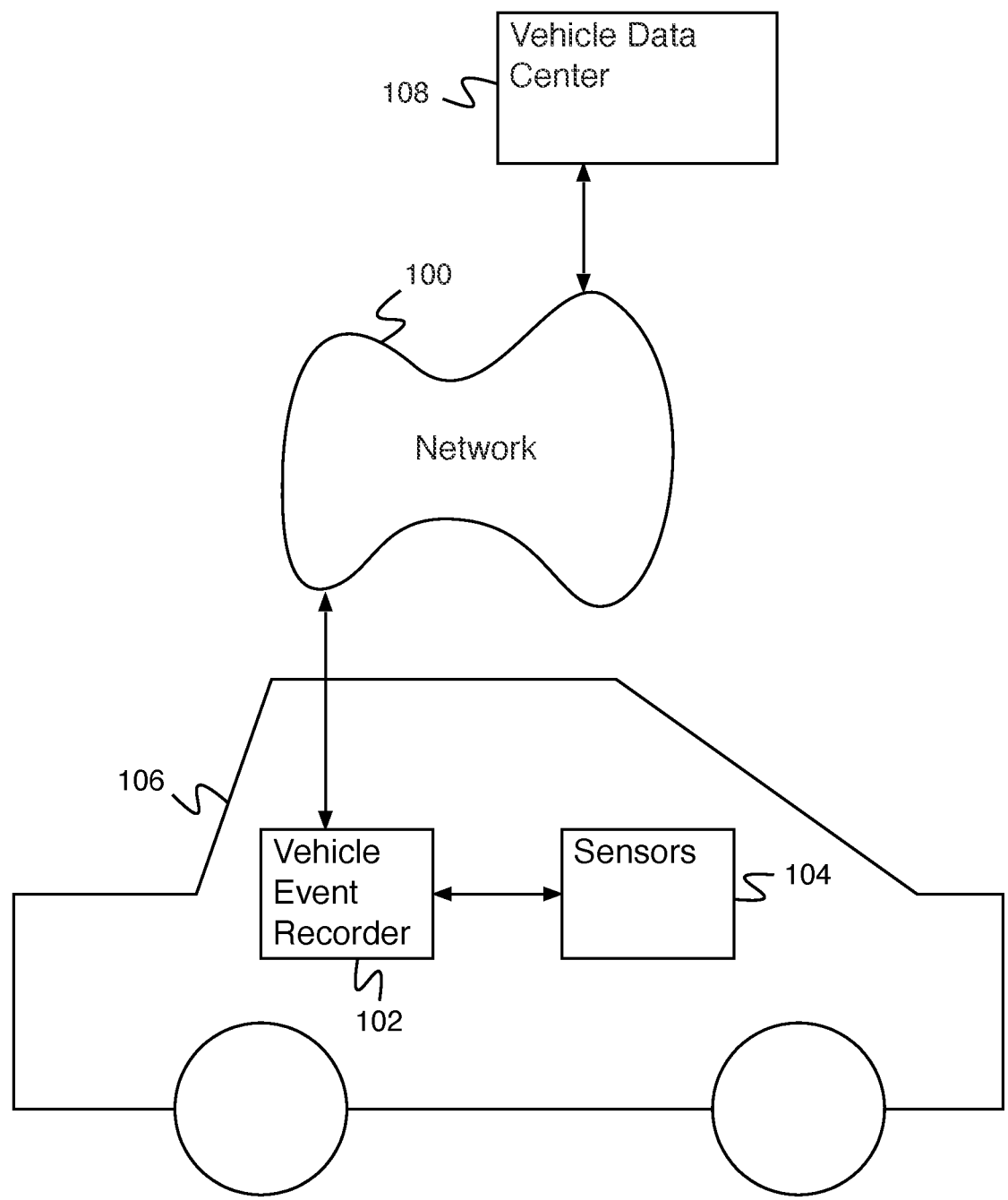
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for location risk determination and ranking based on vehicle events and/or an accident database is disclosed. The system includes an interface and a processor. The interface is configured to receive accident data and/or event data. The processor is configured to determine a set of incident groups, wherein an incident group of the set of incident groups is associated with a set of accidents of the accident data and/or a set of events of the event data that are grouped by location proximity. The processor is further configured to determine a set of traffic estimations, wherein a traffic estimation of the set of traffic estimations is associated with the incident group of the set of incident groups; and determine a ranking of the set of incident groups based at least in part on the set of accidents, the set of events, and the set of traffic estimations.

A system for context based alert filtering using ranked risk from vehicle events and/or an accident database is disclosed. The system includes an interface and a processor. The interface is configured to receive a location of a translating object. The processor is configured to trigger a warning to the translating object based at least in part on its location and the existence of an associated hazard, wherein a secondary condition distinct from the hazard is used to determine relevance of the hazard.

A system for timing or zone alert determination from vehicle events and/or an accident database is disclosed. The system includes an interface and a processor. The interface is configured to receive a location of a translating object. The processor is configured to trigger a warning to the translating object based at least in part on its location and the existence of an associated hazard or hazard type. In some embodiments, a timing associated with the warning is adjusted based at least in part on a secondary condition distinct from the associated hazard or hazard type.

The system uses data from detected vehicle events and/or data from an accident database. These vehicle events and/or accidents are used to determine a set of locations that can be grouped into a set of incident groups. The system also determines traffic estimations (e.g., vehicle traffic estimations) for each of the incident groups in the set of incident groups. The set of incident groups and the traffic associated with each incident group are used to determine a ranking of the risk associated with each incident group for a vehicle, pedestrian, or cyclist at the location associated with the incident group. In addition, this risk is determined given a set of context data related to the vehicle events and/or accident data including the time of day, the day of the year, the day of the week, the season (e.g., winter, spring, summer, or autumn), the weather, the traffic, the lighting conditions, the type of vehicle, the speed of the vehicle, the history of the driver, the time within a route, the time within a vehicle, the physical roadway characteristics from a map (e.g., a roadway slope, a roadway camber, a roadway curvature, intersection type and complexity, etc.), the free flow speed from live traffic, the posted speed limits, the road composition, the road roughness, the road width, the road number of lanes, the road junction type, the road functional class, or any other appropriate context. In various embodiments, in ranking the risk, the ranking is based at least in part on one or more of: the road density in the area (e.g., urban, rural, etc.), the type of road (e.g., a highway type, a ramp type, a city road type, etc.), and the risks are grouped and ranked together by crash cause—for example, by slowing traffic crash type, turn crash type, intersection crash type, train crash type, animal collision crash type, etc. The ranked risk, considered in context, is then used to determine a display of appropriate risky locations related to a driver, a cyclist, a pedestrian and their location and direction of travel. The ranked risk and the context are also used to determine a timing or location zone for triggering an alert to a driver, a cyclist, or a pedestrian regarding a relevant risk.

In some embodiments, the system enables a driver, a cyclist, and/or a pedestrian to receive risk locations normalized for traffic as they move around. The locations are displayed on a user interface based at least in part on the contextual conditions to show areas that are riskier under the current conditions. Alerts can be triggered when the driver, cyclist, or pedestrian location enters a zone around a risk location (e.g., an area around an incident group). Similarly, alerts can be triggered when the driver, cyclist, or pedestrian is about to be in a zone around a risk location (i.e., within a certain time to enter the zone).

In some embodiments, the system makes the computer better by making efficient identification of risk locations in order to warn a driver. The system enables improved identification of risk using information regarding past identified events and/or past accidents and their correlation with sensor information and other information that provides context information. The system further improves the computer's ability to assess risk by determining a ranking of risk based on the calculation of risk accounting for the amount of traffic and the number of identified events and/or past accidents. The system provides a more efficient user interface by displaying or indicating (e.g., using an audio warning) to a driver upcoming risks in a timely manner enabling a driver to avoid risks (e.g., brake, slow down, be more vigilant, etc.).

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 is in communication with vehicle sensors 104. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), advanced driver assistance system (ADAS) sensors, a GPS, outdoor temperature sensors, moisture sensors, line tracker sensors (e.g., laser line tracker sensors), a lane change sensor, etc. Vehicle state sensors comprise internal vehicle state sensors, for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc. Vehicle event recorder 102 comprises a system for receiving and processing sensor data. Processing sensor data comprises filtering data, identifying patterns in data, detecting events from the sensor data received, etc. In various embodiments, event and event data are determined using vehicle event recorder 102 and/or vehicle data center 108 using sensor data and once determined to store and/or transmit event data on or by or between a vehicle event recorder 102 and/or the vehicle data center 108—for example, stored event data and/or transmitted comprises stored data of events—for example, an event location, an event type (e.g., a hard brake, an acceleration, a noise, an eating event, a cell phone event, a drowsiness event, a distracted driver event, a passenger event, a lane departure event, a proximity following event, a smoking event, a seat belt event, a safety event, etc.), an event time, an event party (e.g., a driver, a passenger, a pedestrian, a cyclist, etc.), an event vehicle (e.g., a type, a make, a model, a condition, etc.), an event date, an event weather condition, an event road condition, etc. Vehicle event recorder 102 is mounted on vehicle 106 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components.

Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night).

In some embodiments, the system is run offline on vehicle event recorder 102 or a mobile device (not shown) with no communication with network 100.

In some embodiments, to run the system fully offline the entire hotspot database is taken off line and embedded in vehicle event recorder 102 or any other client (e.g., a mobile device, a mobile tablet, a mobile phone, etc.).

In some embodiments, to run the system partially offline (e.g., in a region with spotty connectivity via a wireless network), the system uses caching in which, for example, if a driver is driving on a road the system automatically caches identified data by looking ahead a distance N and fetching all the hazards along the road in front of the driver that are a distance N away (e.g., N comprises 2 km, 4 km, 6 km, 8 km, 10 km, 20 km, etc.). In some embodiments, if a driver is in a city, the system automatically caches identified data that falls within a radius surrounding the driver. In some embodiments, if the system is aware of the path the driver is taking (e.g., by being tapped in to a navigation system), the system caches identified data along the route.

In some embodiments, when the system is offline there is no access to live traffic data, so the system uses stored data about when crashes are most likely to take place to trigger the alert. For hazards that are dangerous when there is high traffic, a time period corresponding to these crashes will be a period of high traffic and this information can be used as a proxy for traffic data. In some embodiments, historic traffic data is used to find other periods of time where traffic is likely to be high at a given location and alert during those periods.

Vehicle event recorder 102 communicates with vehicle data center 108 via network 100. Vehicle data center 108 comprises a remote server for data storage, data analysis, data access by a coach and/or manager, data review by a human reviewer, etc For example, vehicle data center 108 comprises a system for location risk determination and ranking based on vehicle events and/or accident database. The system is configured to receive accident data and/or event data; determine a set of incident groups, wherein an incident group of the set of incident groups is associated with a set of accidents of the accident data and/or a set of events of the event data that are grouped by location proximity; determine a set of traffic estimations, wherein a traffic estimation of the set of traffic estimations is associated with the incident group of the set of incident groups; and determine a ranking of the set of incident groups based at least in part on the set of accidents and/or the set of events and the set of traffic estimations.

As another example, vehicle data center 108 comprises a system for context based alert filtering using ranked risk from vehicle events and/or an accident database. In some embodiments, both the accident database and/or driver hazard alert application are embedded and updated directly on a storage device much like a map of the road. The system is configured to receive a location of a translating object; and trigger a warning to the translating object based at least in part on its location and the existence of an associated hazard, wherein a secondary condition distinct from the associated hazard is used to determine relevance of the associated hazard. In some embodiments, the secondary condition is used to determine in real time the relevance of the associated hazard.

As yet another example, vehicle data center 108 comprises a system for timing or zone alert determination from vehicle events and/or an accident database. The system is configured to receive a location of a translating object; and trigger a warning to the translating object based at least in part on its location and the existence of an associated hazard or haward type. In some embodiments, a timing (e.g., how far in advance of a hotspot to show an alert) associated with the warning is adjusted based at least in part on a secondary condition distinct from the associated hazard or hazard type.

Figure 2:
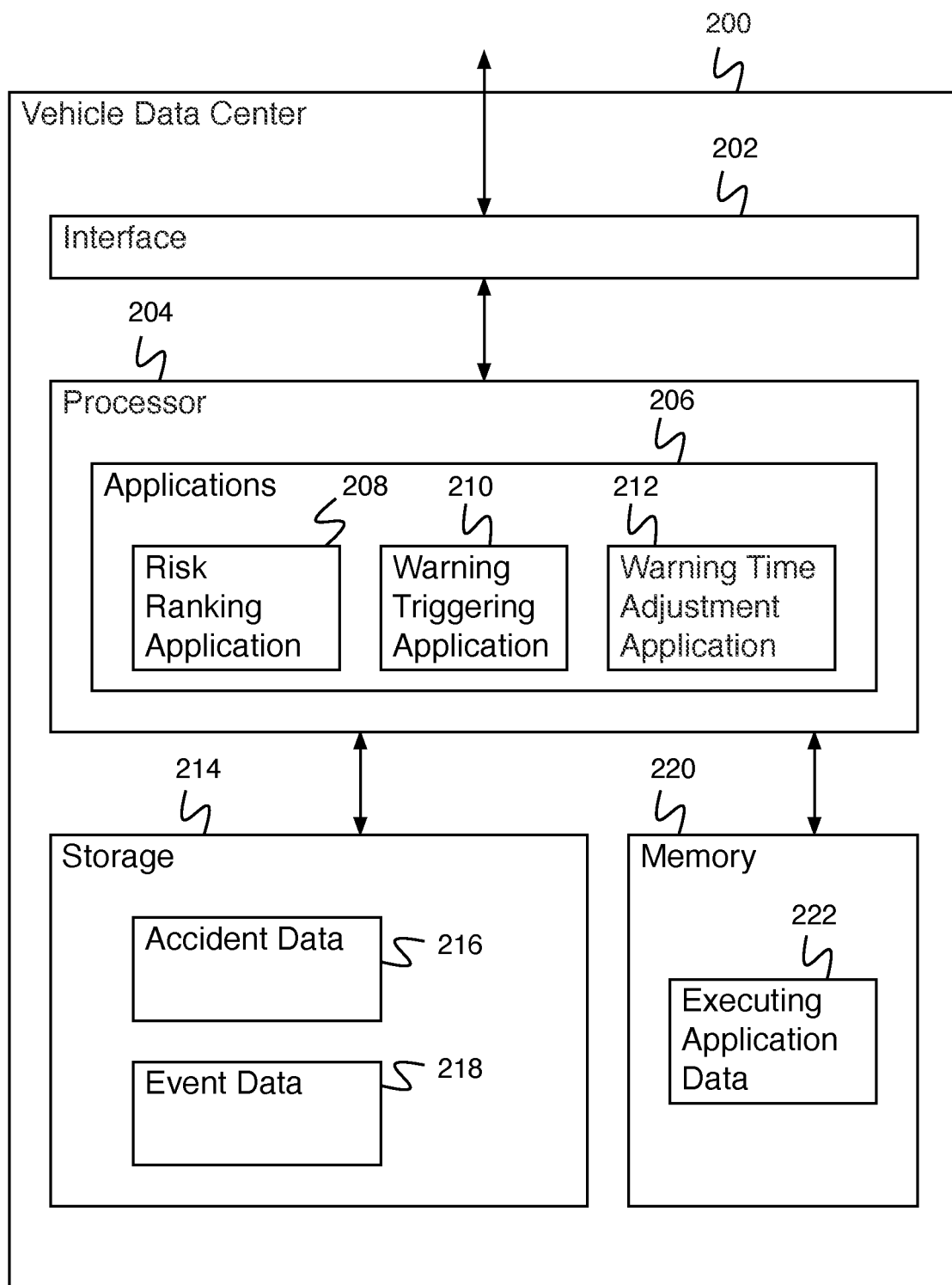
FIG. 2 is a block diagram illustrating an embodiment of a vehicle data center.

FIG. 2 is a block diagram illustrating an embodiment of a vehicle data center. In some embodiments, vehicle data center 200 comprises vehicle data center 108 of FIG. 1. In various embodiments, vehicle data center 200 comprises a computer, a networked set of computers, a cloud computing system, or any other appropriate vehicle data center system. In the example shown, vehicle data center 200 comprises interface 202. For example, interface 202 comprises an interface for receiving sensor data, receiving a request to identify sensor data associated with a target, receiving network communications, receiving a detector, receiving vehicle data comprising data associated with a vehicle over a period of time, receiving driver location data comprising location data associated with one or more drivers of a roster of drivers, providing an indication of an anomalous event, providing sensor data, providing communications, providing an indication sensor data associated with a target was identified, etc. Processor 204 comprises a processor for executing applications 206. Applications 206 comprise risk ranking application 208, warning triggering application 210, and warning time adjustment application 212 (e.g., an application to determine how far in advance of a hotspot to show an alert).

Risk ranking application 208 comprises an application for location risk determination and ranking based on vehicle events and/or accident database. The application receives accident data and/or event data; determine a set of incident groups, wherein an incident group of the set of incident groups is associated with a set of accidents of the accident data and a set of events of the event data that are grouped by location proximity; determines a set of traffic estimations, wherein a traffic estimation of the set of traffic estimations is associated with the incident group of the set of incident groups; and determines a ranking of the set of incident groups based at least in part on the set of accidents, the set of events, and the set of traffic estimations.

Warning triggering application 210 comprises an application for context based alert filtering using ranked risk from vehicle events and/or an accident database. The application receives a location of a translating object; and triggers a warning to the translating object based at least in part on its location and the existence of an associated hazard, wherein a secondary condition distinct from the hazard is used to determine relevance of the hazard.

Warning time adjustment application 212 comprises an application for timing or zone alert determination from vehicle events and/or an accident database. The application receives a location of a translating object; and triggers a warning to the translating object based at least in part on its location and the existence of an associated hazard or hazard type. In some embodiments, a warning is triggered based on a region size that depends on a hazard or hazard type (e.g., a low bridge, merging traffic, slowing traffic, turn, intersection, train, animal, etc.). In some embodiments, a timing associated with the warning is adjusted based at least in part on a secondary condition distinct from the associated hazard or hazard type. In some embodiments, the one or more of secondary conditions comprises a speed limit, a road geometry, a vehicle velocity, an approach heading/angle, intersection type, a weather information, a real-time weather information, a traffic information, or any other appropriate condition. In some embodiments, an alert is not triggered at all (e.g., if a driver is not driving towards an alert region).

Storage 214 comprises accident data 216 and event data 218. Accident data 216 comprises historic data of accidents—for example, an accident location, an accident type, an accident time, an accident party (e.g., a driver, a passenger, a pedestrian, a cyclist, etc.), accident vehicles involved (e.g., a type, a make, a model, a condition, etc.), sequences of maneuvers, an accident date, an accident weather condition, an accident road condition, etc. Event data 218 comprises historic data of events—for example, an event location, an event type (e.g., a hard brake, an acceleration, a noise, an eating event, a cell phone event, a drowsiness event, a distracted driver event, a passenger event, a lane departure event, a proximity following event, a smoking event, a seat belt event, a safety event, etc.), an event time, an event party (e.g., a driver, a passenger, a pedestrian, a cyclist, etc.), an event vehicle (e.g., a type, a make, a model, a condition, etc.), an event date, an event weather condition, an event road condition, etc. Memory 220 comprises executing application data 222 comprising data associated with applications 206 (e.g., intermediate processing data, current event data, context data, vehicle interior context data, vehicle exterior context data, etc.). In various embodiments, an event is determined from data received or taken by a vehicle event recorder, the data is used to determine the event using a threshold on the data (e.g., the data is greater than a threshold—for example, acceleration from a vehicle event recorder accelerometer is greater than a threshold value), using a profile or pattern or set of the data (e.g., the set of data received from sensors on a vehicle or vehicle event recorder matches a profile of data—for example, a pattern of data measurements received by a vehicle event recorder matches using a model with a metric greater than a threshold), using a machine learning model (e.g., data from cameras and/or other sensors on the vehicle or vehicle event recorder are processed using a machine learning model to determine whether the data matches an event type such as an eating driver of a driver as the driver is driving, a cell phone event as a driver is driving, a distracted driver event, a passenger event, a lane departure event using computer vision to detect lanes and determine a lane change, a proximity event using computer vision or sonar or lidar to detect following distance to a forward vehicle, a smoking event, a seat belt event, etc.), or any other appropriate manner of detecting an event from vehicle sensor data and/or vehicle event recorder sensor data. In some embodiments, recent, real-time, and/or historic event data are combined with or used independently from accident data to determine driver risk.

Figure 3:
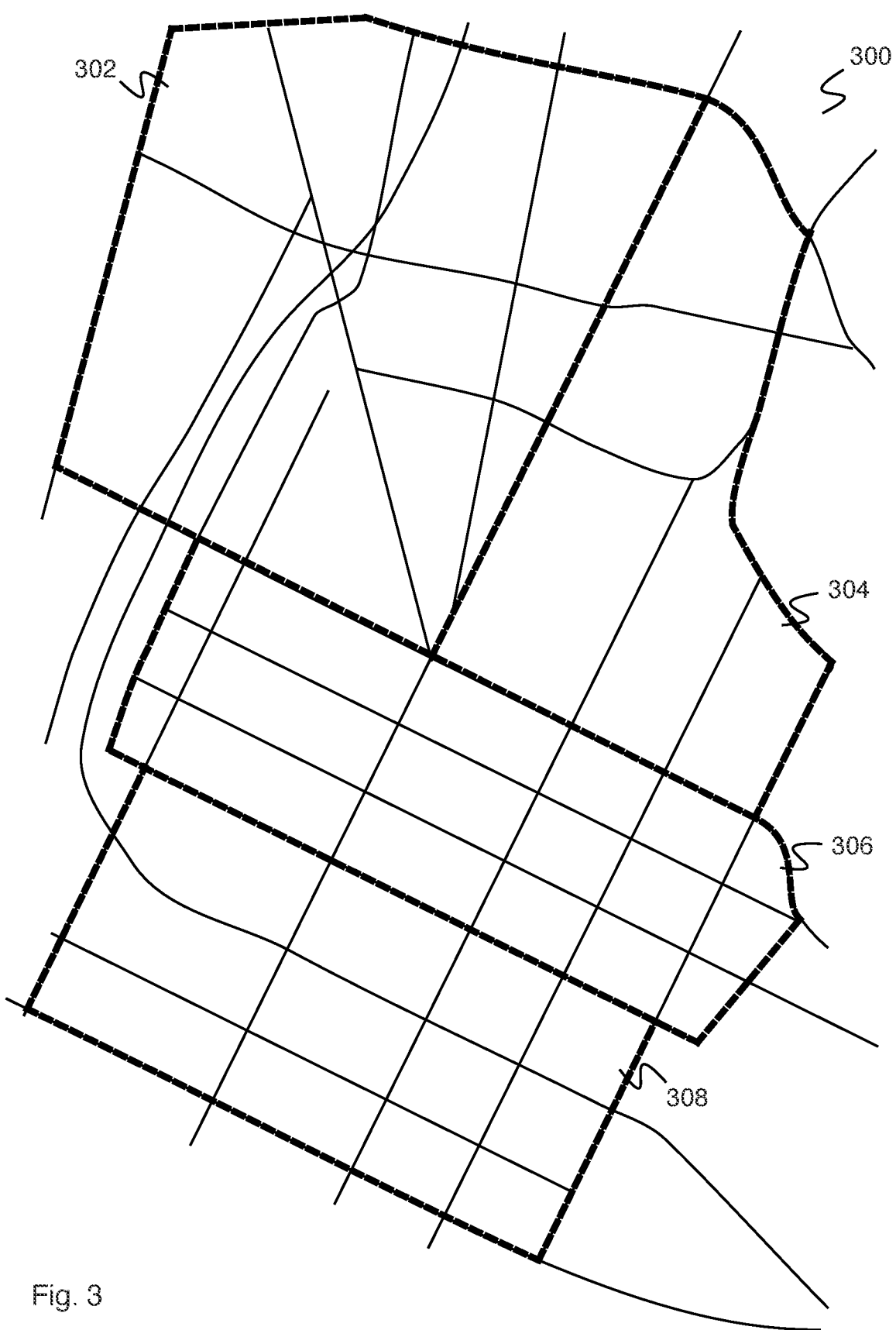
FIG. 3 is a diagram illustrating an embodiment of a map used for risk determination.

FIG. 3 is a diagram illustrating an embodiment of a map used for risk determination. In the example shown, map 300 includes region 302, region 304, region 306, and region 308. In some embodiments, data is received for determining street maps (e.g., from OpenStreetMap).

Figure 4A:
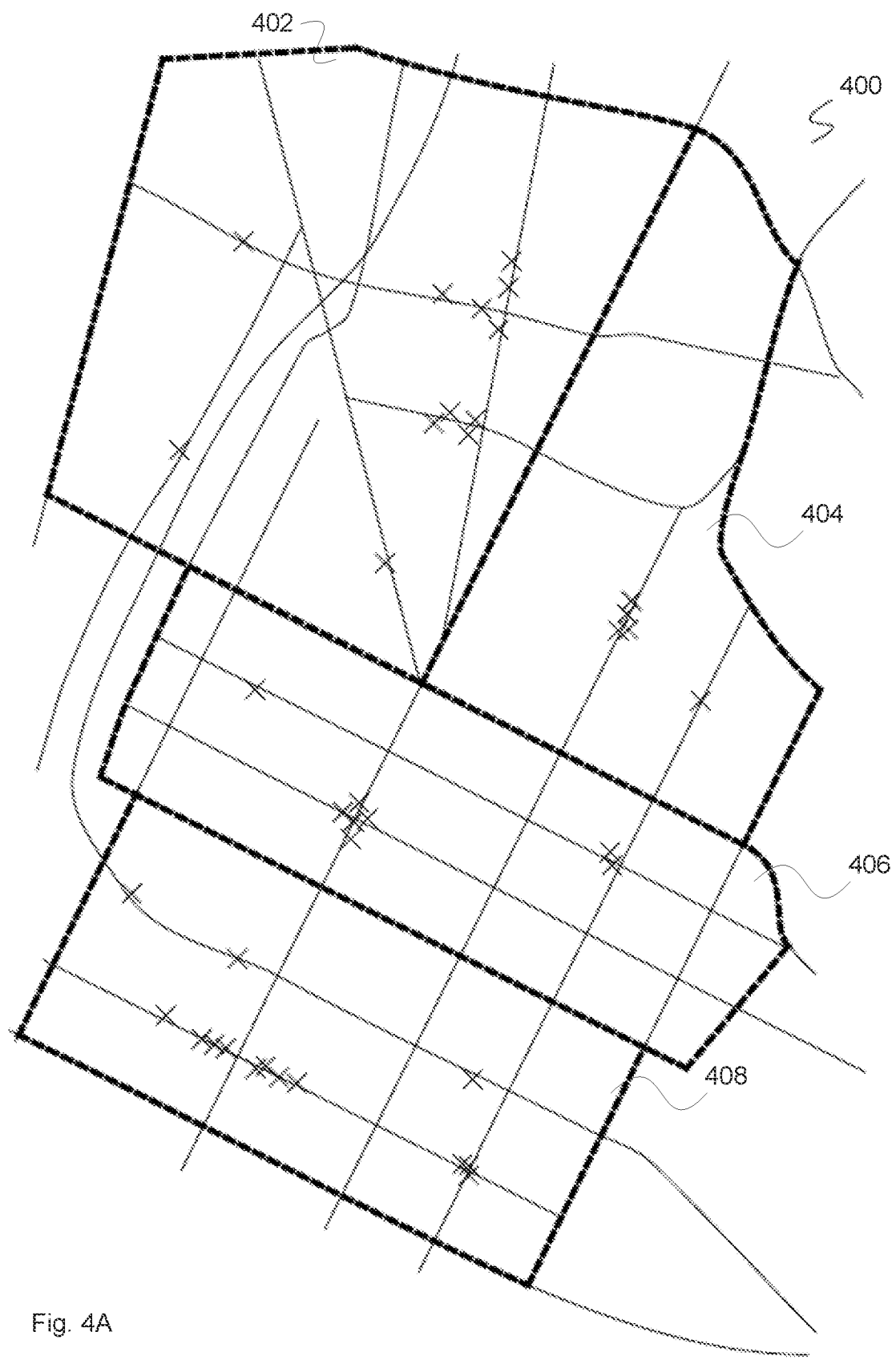
FIGS. 4A, 4B, and 4C are diagrams illustrating embodiments of maps used for risk determination.
Figure 4B:
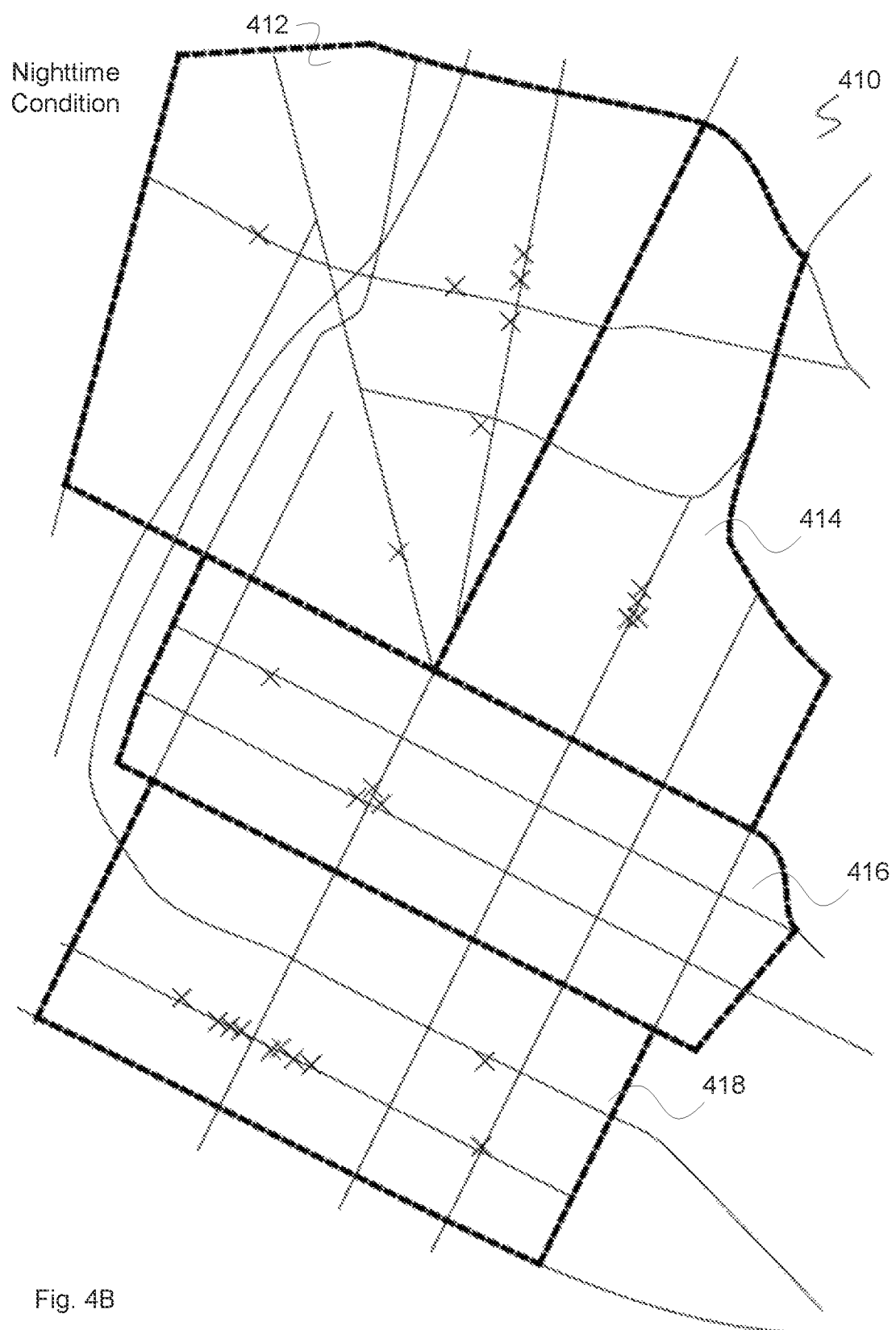
Figure 4C:
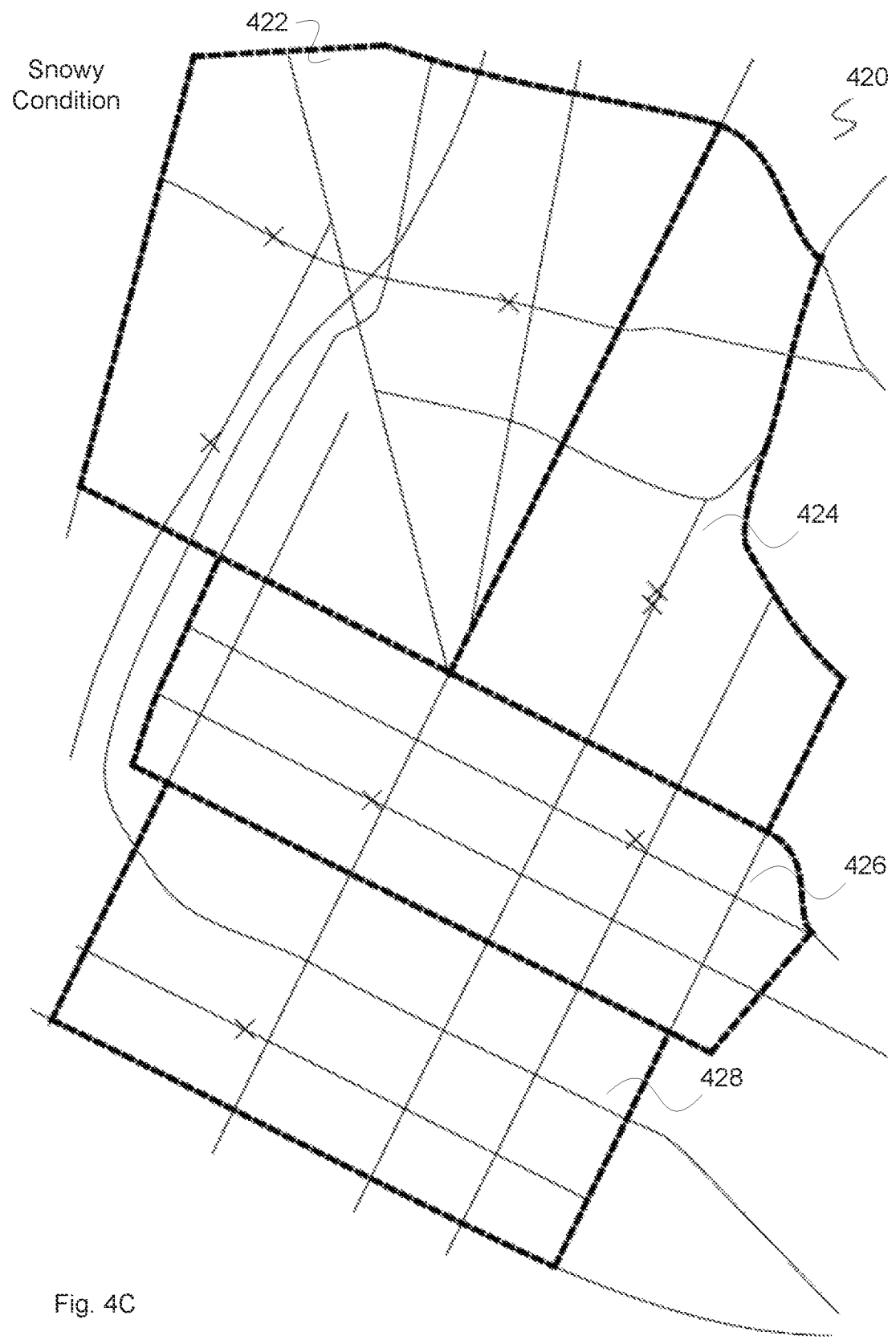

FIGS. 4A, 4B, and 4C are diagrams illustrating embodiments of maps used for risk determination. In some embodiments, map 400 of FIG. 4A, map 410 of FIG. 4B, and map 420 of FIG. 4C correspond to map 300 of FIG. 3. In the example shown in FIG. 4A, region 402, region 404, region 406, and region 408 include crash locations (e.g., indicated by 'x'). In the example shown in FIG. 4B, region 412, region 414, region 416, and region 418 include crash locations (e.g., indicated by 'x') filtered by a nighttime condition. In the example shown in FIG. 4C, region 422, region 424, region 426, and region 428 include crash locations (e.g., indicated by 'x') filtered by a snowy condition.

Figure 5:
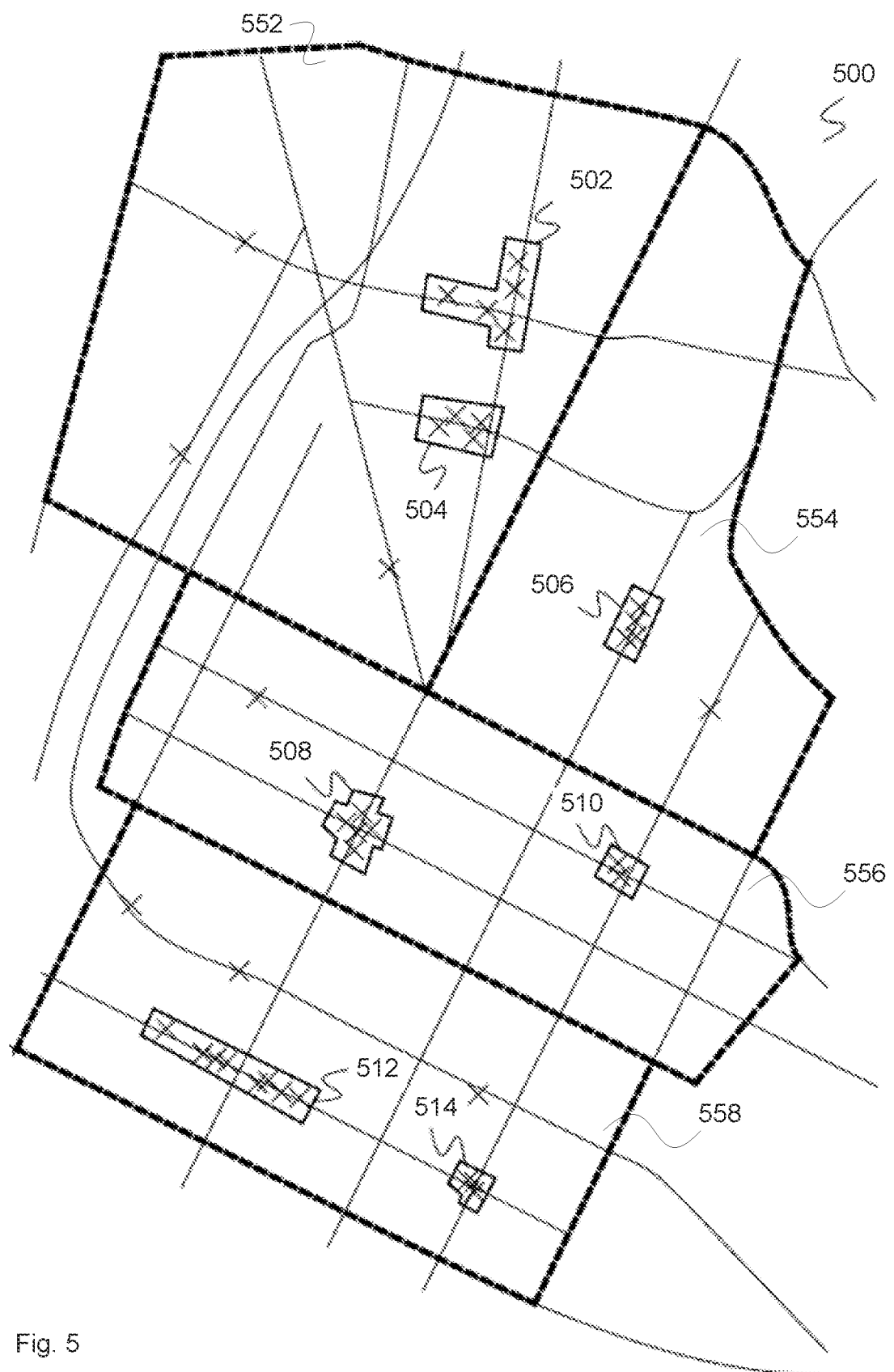
FIG. 5 is a diagram illustrating an embodiment of a map used for risk determination.

FIG. 5 is a diagram illustrating an embodiment of a map used for risk determination. In some embodiments, map 500 of FIG. 5 corresponds to map 300 of FIG. 3, map 400 of FIG. 4A, map 410 of FIG. 4B, and/or map 420 of FIG. 4C. In the example shown, clusters of crash locations are surrounded by zone boundaries. In some embodiments, the zone boundaries surround alert zone areas. Crash locations are determined to be in a cluster together and a boundary around the cluster is determined. For example, cluster and boundary 502 that is associated with an intersection in region 552, cluster and boundary 504 that is associated with an intersection in region 552, cluster and boundary 506 that is associated with a road in region 554, cluster and boundary 508 that is associated with an intersection in region 556, cluster and boundary 510 that is associated with an intersection in region 556, cluster and boundary 512 that is associated with an intersection in region 558, and cluster and boundary 514 that is associated with an intersection in region 558.

Figure 6:
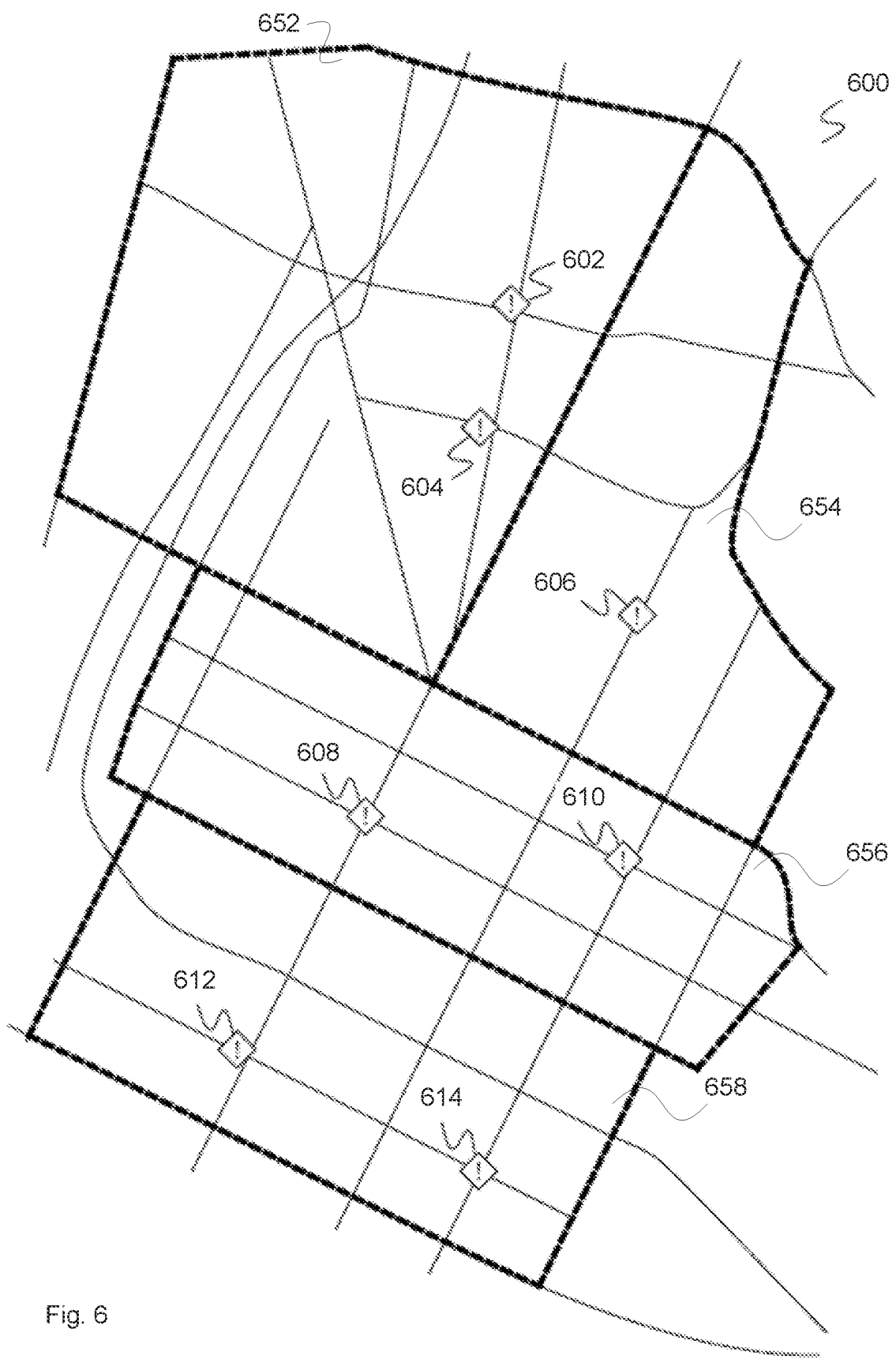
FIG. 6 is a diagram illustrating an embodiment of a map used for display of risk in an application to a user.

FIG. 6 is a diagram illustrating an embodiment of a map used for display of risk in an application to a user. In some embodiments, map 600 of FIG. 6 corresponds to map 300 of FIG. 3, map 400 of FIG. 4A, map 410 of FIG. 4B, map 420 of FIG. 4C, and/or map 500 of FIG. 5. In the example shown, displayed warnings comprise warning 602 and warning 604 of region 652, warning 606 of region 654, warning 608 and warning 610 or region 656, and warning 612 and warning 614 of region 658.

In some embodiments, the processing of incidents (e.g., crashes to determine clusters, boundaries associated with clusters, alert regions associated with the boundaries, and/or warning displays associated with alerts are as follows. In some embodiments, the received data is enriched with data sets from other sources to create custom maps that are optimized for crash hotspot analysis. For example, the enriching data includes traffic data and elevation data. In some embodiments, traffic enriching data comprises national historic traffic volume map from the United States Department of Transportation Federal Highway Administration (USDOT FHWA). In some embodiments, merging traffic data into the map data includes estimating traffic in map areas or during times without historic traffic data. In some embodiments, traffic is estimated using linear regression on all roads for the gap years without traffic volume data. In some embodiments, traffic is estimated using averaging by nearby roads of similar functional classes and physical characteristics. For example, traffic estimation of a road segment of I-5 South will average a few nearby segments of I-5 that do have DOT traffic counts for the same calendar year, in the same direction, lanes, and functional class within a reasonable distance. For example, ramp traffic volume is estimated as a fraction of inbound and outbound roads. In some embodiments, elevation enriching data comprises United States Geological Survey (USGS) elevation data. In some embodiments, road segment slope is calculated using the USGS elevation data. In some embodiments, contiguous uphill and downhill roadways are inventoried. In some embodiments, road segments associated with a specific hill are identified.

In some embodiments, an urban density map is created using the length of a road network as a proxy for population (e.g., the more road length in an area, the more population; the less road length in an area, the less population). In some embodiments, the urban density is used to tune hotspot analysis parameters.

In some embodiments, crash data is prepared from each state Department of Transportation (DOT) for analysis. For example, DOT crash data is acquired and imported into the database. In some embodiments, importing includes extracting and normalizing useful data points from the DOT. Common DOT data points used in hotspot analysis comprises one or more of the following: crash data points (e.g., timestamp, global positioning system (GPS) location, road location, contributing factors, weather, road condition, officer notes, etc.), person data points (e.g., injuries, age, seating position, law enforcement citations, distractions, driving under influence (DUI) results, etc.), and vehicle data points (e.g., type, areas damages, harmful events, sequence of events, objects struck, etc.).

In some embodiments, each DOT crash is validated and/or repaired. For example, irregularities in DOT crash data such as incorrect time stamps, invalid victim ages, incorrect GPS coordinates, incorrect crash locations, etc. In some embodiments, GPS coordinates are checked against internal maps geographically and DOT provided location reference points such as mileposts, road names, and other road features. In some embodiments, crash locations are checked against a text description of crash location in a crash report.

In some embodiments, each crash is normalized into an internal table format. For example, driver road hazards are resolved at each crash location using columns in DOT crash data such as contributing factors, weather, road surface conditions, date/time, citations, etc.; contributing factors to crash and other metadata (e.g., unit type: cyclist, pedestrian, vehicle classes, animal classes, etc.; unit maneuvers: straight, slowing in traffic lane, left/right turn, leaving a parked position, negotiating a curve, etc.; manner of collision: front to rear, head-on, sideswipe, same/opposite travel direction, collision with moving vs. stationary vehicle, collision with vehicle within or outside of the trafficway, etc.; work zone types or whether workers were present; road surface condition; collision with specific types of fixed or non-fixed objects; sequence of events of the driver actions leading up to the collision, vehicles involved, and harmful events; driver distractions, driving under the influence (DUI) test results, and traffic citations if any; person seating position; a number and ages of pedestrians involved in cases; etc.) are extracted for analysis (e.g., collision sequence is extracted from the crash data report tables and arranged in chronological order to determine root cause of the crash—for example, the vehicles involved, actions prior to the first crash, hazardous actions, and subsequent impact points are used to resolve the primary hazard keywords for each crash, etc.); crashes are validated against internal map of the classified road network to remove invalid crashes with invalid location data; crashes are classified into tables based on the high-level crash types using the crash and road on which the crash occurred. In various embodiments, crash types comprise one of the following: crashes involving domestic or wild animals, crashes occurring on city/local roads, crashes involving bicyclist, crashes involving falling or fallen objects (e.g., trees, rocks, snow, other debris, etc.), crashes occurring on highway roads, crashes occurring on highway ramps, crashes involving overhead structures such as bridges and trees, crashes involving pedestrians, crashes involving trains or trolleys, or any other appropriate crash type.

In some embodiments, initial hotspot clusters are created using a machine learning model (e.g., using density-based spatial clustering of applications with noise (DBSCAN) clustering method) looking at the crashes in the normalized table. The parameters used to cluster crashes vary depending on the crash type and the geographical location. In some embodiments, the minimum distance, and the minimum number of crashes to form a cluster is varied based on the crash grouping and urban density—for example, crashes involving pedestrians on local roads and rear-end crashes on highways use different parameters, urban and rural areas use different parameters, etc. In some embodiments, sub-clusters are formed within each crash table cluster to highlight specific hazards within each crash group. For example, crashes on highway roads will also form sub-clusters within that type for crashes involving parked vehicles, rear ends, runaway downhill vehicles, crashes involving traffic islands, merging vehicles, etc.

In some embodiments, crash clusters are enriched with location metadata to become hotspots. For example, each crash clusters' geographical information is determined. In various embodiments, geographical information metadata includes one or more of: a center of each crash cluster resolved along the road network (e.g., a cluster point), the location of all incidents within each cluster (e.g., cluster crash locations), geographical boundaries within which all incidents occurring for a crash cluster (e.g., a cluster crash region), a search radius for most relevant roads within the cluster crash region based on the locality and crash type for each cluster (e.g., a traffic road region), a most relevant road segments and intersections associated with each crash cluster (e.g., cluster alert road segment extended geometry), or any other appropriate metadata. In some embodiments, the cluster alert road segment extended geometry is determined by walking the road network extending from within the traffic road region. In some embodiments, metadata is gathered from the most relevant segments and intersections geographically associated with all crash locations within each crash cluster using the crash type and urban density. In some embodiments, the most relevant road intersections are resolved and associated with each cluster. For example, an intersection type is determined (e.g., a traffic circle intersection, a public road intersection, a private parking lot driveway intersection, an alley intersection, a drive intersection, etc.); and an intersection complexity is calculated if a crash is associated graphically with an intersection. In some embodiments, incident totals are then calculated for each crash cluster; and the total traffic exposure/volume is determined at each hotspot using traffic data (e.g., historic traffic volume map data) in the same timeframe as the DOT crash data. In some embodiments, the crash rate is calculated for each cluster using the total traffic exposure/volume. In some embodiments, other road network metadata is determined associated with each crash cluster including: finding exit and entrance roads if the crash cluster occurs on a ramp, other road data (e.g., curvature and slope of the road, presence of a tunnel within N seconds, type of junction: a road merge point, a public road intersection, or private road intersection, etc.), and locality information. In some embodiments, the urban density is determined where each crash occurred and stored associated with the crash. In some embodiments, the crash cluster location information includes a normalization of crash data (e.g., incidence of crashes by traffic density).

In some embodiments, compatible hotspots in close proximity are merged. For example, hotspots are analyzed and refined from above by sub-clustering using knowledge of the road network, crash type's hazard compatibility, and proximity of surrounding crash hotspots. As a specific example, there may be many similar overlapping hotspots along a road (e.g., a highway); and a merging algorithm merges the hotspots to create a single localized hotspot that best represents compatible surrounding hazards.

In some embodiments, a merging algorithm comprises: 1) receiving initial crash clusters from a cluster algorithm (e.g., DBScan); 2) determine a hotspot final alert type using a key words of most frequently occurring incident/crash hazard and the surrounding geographical context using the crash cluster table; 3) convert the hotspot to a more specific hotspot subtype using the geographical context if the crash data lacks a specific hazard (e.g., convert generic caution hotspot to a more specific alert based on roadway information to a more specific alert such as hill, curve, intersection, etc.; convert "watch for pedestrians" hotspot to a "watch for children" hotspot using party ages; convert generic intersection alert to a more specific alert using intersection type, intersection complexity, intersection location (e.g., private road entrance to a driveway, alley, etc.); convert generic slowing traffic alert to specific type using intersections, presence of tunnel ahead on road, etc.; and adds weather specific hotspot subtype if crash rate during specific weather conditions is higher relative to others); 4) create an alert region column for each cluster along the roadway specific to the determined hotspot message alert type; 5) determine alert region based on road type to best alert driver (e.g., alert region based in intersections on public roads, alert region based in one directional roads, alert regions based on two direction roads, alert regions based on traffic circles, alert regions based on intersections with private roads (e.g., alleys, parking lot driveways, drive-throughs, etc.), alert regions based on up/down hill roads, alert regions based on curves that are not intersections, alert regions based on parking lots, and alert regions based on ramps); 6) clusters are analyzed to combine crash clusters by overall compatibility using factors such as proximity, overlap, resolved hazard or hazard type, and knowledge of road network; and 7) repeat for remaining compatible hotspot/clusters in proximity that can be combined/merged from the previous iteration.

In various embodiments, merging hotspots for local/city roads includes one or more of the following criteria: merging hotspots in response to whether they are of compatible hazards or hazard types; merging hotspots in response to whether they have compatible weather conditions, merging combinations of compatible intersection and/or non-intersection hotspots nearby with variable levels of geographic overlap, distance from the hotspots' center, have shared road segments, or any other appropriate criterion.

In some embodiments, a hotspot alert region overlap ratio and a distance between the center of the hotspot that share a common set of road segments are used as a physical requirement for merging adjacent compatible hotspot types. For example, parameters in dense urban areas (e.g., an urban area such as New York City (NYC)) for merging intersections with compatible non-intersection hotspots are to merge hotspots only if they have road segments in common, are within an N meter distance (e.g., N=25 meters or a distance less than the suburban and rural areas), and the alert region's surface area overlap by at least M % (e.g., M %=50% or a percentage greater than the suburban and rural areas). As another example, parameters in suburban or rural areas (e.g., suburban and rural areas in upstate New York) for merging intersection hotspots with compatible non-intersection hotspots are more aggressive because of larger distances between hotspots. In this case, the parameters are evaluated to merge hotspots only if they are within an L meter distance (e.g., L=75 meters or a distance greater than the urban areas) and the alert region's surface area overlap by at least K % (e.g., K %=25% or a percentage less than the urban areas). In some embodiments, the distance between hotspot centers and overlap ratio parameters are variable based on urban density and road/intersection map metadata when merging adjacent compatible hotspots. In various embodiments, the strongly overlapping criteria are hard-coded, the strongly overlapping criteria are variable based on the size of the intersection box, or any other appropriate manner of setting the strongly overlapping criteria. In various embodiments, merging hotspots includes one or more of: determining whether the non-intersection hotspots are on the same primary roads or intersections; determining whether an intersection hotspot and a non-intersection hotspot is within a threshold distance; determining whether the hotspots are within a same intersection; determining whether the hotspots overlap in area a threshold amount (e.g., 50% overlap, 75% overlap, 90% overlap, etc.), determining whether two traffic circle intersection hotspots overlap in area a threshold amount (e.g., 10% overlap, 25% overlap, 50% overlap), determining whether two private intersection hotspots overlap in area more than a threshold amount (e.g., 50% overlap, 75% overlap, 90% overlap, etc.), or any other appropriate criterion.

In some embodiments, merging non-intersection hotspots with compatible non-intersection hotspots nearby with a medium geographic overlap comprises using a non-intersection merge criteria, which ensures that adjacent hotspots that are similar enough to the driver geographically and share the same road segments are combined even if there are distinct clusters using DBScan (which has limited knowledge of the road). In some embodiments, a medium geographic overlap of a primary hotspot center's distance from the secondary hotspot's center varies by the urban density of the location. For example, in NYC the distance between an intersection and non-intersection hotspot on the same road is a distance scaled to a city block (e.g., is less than or equal to 75 meters, which is less than the length of a typical city block), but for a rural area this distance is scaled higher (e.g., 400 meters) as the distance between intersections is greater. In order to merge the hotspots, two hotspots also must overlap by greater than or equal to a threshold in alert region surface area (e.g., an overlap greater than or equal to 25%) to ensure that the hotspots are related. In some embodiments, merging hotspots on highways roads is similar to local/city roads except that distances and parameter thresholds are tuned to larger distances to account for higher speed limits. In various embodiments, merging hotspots for a highway ramp includes one or more of the following: determining road angles to prevent merging adjacent cloverleaf ramp nodes; determining that hotspots are merged in response to being on the same ramp and if they enter and exit the same road; determining that the hotspots are merged on a ramp if the hotspots are spatially on the same ramp and if the primary hotspot road line passes through a hotspot candidate location; determining that both roads associated from the ramps intersect to avoid pulling in unrelated adjacent curvy ramps and where both ramp hotspots overlap to a threshold degree; determining that the hotspots that occur in a ramp intersection do not merge with ramp hotspots that do not occur in an intersection; or any other appropriate criterion.

In some embodiments, merging an intersection hotspot with other compatible intersection hotspots nearby with a medium geographic overlap comprises using an intersection to intersection merge criteria if, to the driver, the two hotspots are considered to be in the same intersection even if their alert region and the center of the hotspot are distinct according to the DBScan output. The center of crash hotspots may not always be the geometric centroid. This is done to best communicate the true hazard location to the driver and to assist analysis. For example, the geometric centroid of a hotspot for crashes distributed along a circular or curvy road (e.g., on a cloverleaf ramp, a traffic circle, etc.) can be off the roadway near the center of the circle—the hotspot center is resolved by snapping the centroid to the location of the crash closest to the centroid that is located on the roadway. As another example, the geometric centroid for intersection crash hotspots near a 4-leg intersection may by offset outside of the intersection box if there are crashes near the perimeter of the intersection that pull the centroid away from the center of the intersection box. In this case, the hotspot center is resolved by snapping the hotspot's geometric center to the middle of the intersection box if most crashes occur within the intersection. An intersection location may be defined as any location where the road configuration of two or more distinctly named roads or roads of differing functional classes converge such as a controlled intersection, an uncontrolled intersection, a traffic circle, an intersection on a public road with a private road such as a driveway, or highway ramp junction. In some embodiments, one or more "strongly overlapping" criteria is/are used for intersection hotspot merging—for example, alert region surface area overlap must be greater than or equal to a threshold percentage (e.g., greater than or equal to 50%), distance between the hotspot centers are less than or equal to threshold distance (e.g., less than or equal to 20 meters) apart, and have road segments in common to ensure only hotspots within the same intersection are merged. In some embodiments, a table is created containing crash histogram by time interval for each hotspot based on message type. For example, an alert region is stored in an alert region column which is intended to provide the driver with an accurate visual representation of the hotspot's roadway region where the hazard exists. Alert regions provide an application with a geographical boundary and metadata to raise appropriate alerts. In some embodiments, alert regions are constructed based on alert region type. For example, for one directional roads, an alert region does not extend past a hotspot center so that an application knows when to dismiss an alert, the length of the inbound alert region is measured to a length of N seconds of travel time (e.g., 9 seconds) at the maximum speed limit of each road to arrive at a first crash, and the alert region is intended to cover the width of the roadway by estimating pavement width using map metadata such as the number and width of lanes, type of road, and the urban context.

As another example, for two directional roads, an alert region on a two-way road represented by a single road segment on the map is constructed in a similar way to a one-way road above, except that the alert region extends in both directions with the length defined by the time to the first crash for the appropriate arrival direction.

As another example, for highway ramps, a ramp alert region is constructed to capture all road segments of an individual ramp from the entrance to exit in a way that avoids contamination from nearby ramp hotspots.

As another example, for traffic circles, an alert region is constructed using all road segments in the circle itself, all public road segments leading in and out of the traffic circle, where the length of the inbound alert region is determined as a length equivalent to M seconds travel time (e.g., 10 seconds) at the maximum speed limit of each road to arrive at the first crash or the traffic circle itself.

As another example, for intersections on public roads, an alert region includes inbound alert region is determined as a length equivalent to L seconds travel time (e.g., 10 seconds) at the maximum speed limit of each road to arrive at the first crash or the intersection itself, does not include outbound one-way road segments so that alerts can be disabled after exiting the intersection, does include outbound two-way road segments as the inbound part of the road segment will have an alert associated with it, is scaled for urban/rural/road density.

As another example, for intersections with a private road, an alert region includes outbound direction for alerts as the driver exits the private road (e.g., alley, parking lot, driveway, drive-through, etc.).

As another example, for up and down hill roads, an alert region comprises including the entire hill in the alert region instead of just the road segment directly nearby. The alert region searches for consecutive road segments from a crash hotspot center with a slope greater than a minimum slope in a similar slope direction until reaching a flat section of a threshold length. The length of the alert region is determined based on the maximum speed limit and length of K seconds travel time to arrive at a first crash of the hotspot.

As another example, for curves on one and two directional roads when not at an intersection, an alert region comprises determining a length of J seconds travel time to arrive at a first crash of the hotspot or before a series of turns prior to the first crash site at the maximum speed limit. For example, this type of alert region requires analyzing the road for turn types leading up to the crash hotspot. This enables alerting the driver before the start of a series of turns or before the first crash in the hotspot whichever has a longer lead time. This is done by producing a summary from the road segments leading up to the crash hotspot. The resulting summary of the road leading up to the crash clusters' center can comprise a series of road segments that include several straight and turning road segments (e.g., Straight→Right-→Straight→Right), which enables creating an alert region that is long enough to alert the driver before of the start of the series of turns. In some embodiments, the system uses the heading of the vehicle and the approach angle sent for the hazard to determine if the hazard coming up is a left turn or a right turn. For example, on a two lane road the left/right directionality is dependent on which way you're driving on the road. In some embodiments, the text of the message and the icon used to display to a user is based on the determination of left turn or right turn.

As another example, for cyclist and pedestrian modes, an alert region is derived from crash hotspots for a motor vehicle. In some embodiments, the user can transition an application from a driving mode to a pedestrian/cyclist mode. In some embodiments, the transition between a driving mode and a pedestrian/cyclist mode is automatic (e.g., as triggered when detecting a change of state—for example, using GPS data, using accelerometer data, etc.). In some embodiments, the pedestrian/cyclist mode enables alerting pedestrians and/or cyclists in non-vehicle accessible areas such as on sidewalks and/or when not alerting vehicles in a nearby or corresponding roadway. For example, a driving mode alert region for pedestrian hazard hotspot for alerting a driver is converted to a pedestrian hotspot. In various embodiments, when in pedestrian mode, alerts are change in the following ways: 1) alerts are only shown that are relevant to pedestrians (e.g., no low bridges, animal crossing alerts, slowing traffic alerts, etc.); 2) the alert regions are changed—the alert regions target the pedestrian so they are shorter, they ignore one-way roads, and they include sidewalks; and 3) the ranking for the alert region changes—more traffic equals a higher rank vs. for drivers more traffic equals lower rank; or any other appropriate modifications for pedestrians vs. drivers. In some embodiments, cycling alerts are similarly different from both pedestrian and driver and are optimized for cyclists—for example, alerts are only shown that are relevant to cyclists (e.g., similar to the pedestrian mode, no driving specific alerts like low bridges, animal crossing, highway alerts, highway ramp alerts, etc.). Alert regions are different than both driving alert regions and pedestrian alert regions. Cyclists generally bike along roads so one-way roads are respected just like cars. The key difference for cycling from car driving is the length of the regions. Since cycling is at slower speeds than driving, the amount of advanced warning is reduced so the alert regions are smaller. In some embodiments, the pedestrian alert region is created using map boundaries of road pavement areas, an intersection box, and surrounding building footprints to create a new version (i.e., pedestrian version) of the hotspot alert region from the driving mode alert region. The pedestrian alert region is used to alert pedestrians but not drivers in vehicles. In some embodiments, a pedestrian mode alert region is constructed to account for the lack of map data related to sidewalks, crosswalks, and pedestrian areas by inferring for or adding these areas to the driver mode alert region. For example, in addition to including regions such as sidewalks for pedestrian alerts, the length of the alert region is often shorter since pedestrians are moving slower, and the region also covers all directions approaching an intersection regardless of whether roads are one-way.

In some embodiments, there is also a scooter specific mode. For example, scooter hazards include those relevant to scooters, so the scooter hazards appear when crash data indicates a scooter was involved. In scooter mode, the one-way-ness of streets would likely be ignored just like in pedestrian mode since scooters often ride on sideways. Scooter alert regions would include sidewalks as well. Scooter alert regions would likely be larger than pedestrian alert regions since they travel faster. In some embodiments, intersections are included in scooter hotspots where pedestrians were hit since intersections that are dangerous to pedestrians are also likely dangerous to scooters and some geographies don't distinguish between pedestrians and scooters in their crash reports.

In some embodiments, a table containing crash histograms is created by time interval for each hotspot based on its message type. For example, a time interval is based on hotspot type (e.g., animal, pedestrian, and cyclist hotspot types have time period groupings of winter, spring, summer, autumn, and 4 hour time blocks (e.g., 1 AM-4 AM, 5 AM-8 AM, 9 AM-12 PM, 1 PM-4 PM, 5 PM-8 PM, and 9 PM-12 AM); and city, ramp, highway, train, and all other types have time period groupings of weekdays, Saturday, Sunday, and 1 hour time blocks (e.g., 1 AM-2 AM, 2 AM-3 AM, etc.). As a specific example, a deer crash hotspot summarizes and ranks incidents seasonally for each month—this is to account for the fact that deer related crashes have a strong seasonal component. In some embodiments, deer time table bucketing is separated by location (e.g., region in the country) as deer seasons in different locations (e.g., north east vs. north west) occur at slightly different times of the year. As another example, a slowing traffic alert on a highway summarizes incidents in 1 hour time periods on weekdays, Saturdays, and Sundays. This hotspot type does not have a strong seasonal component but has an adequate number of incidents to be able to summarize and rank using 1 hour time intervals.

In some embodiments, the crash hotspots are ranked. In some embodiments, ranking comprises an initial ranking and then a second to remove hotspots that are below a group cutoff ranking. In some embodiments, ranking comprises: 1) enrich each crash hotspot with neighborhood urban density data and ID of neighborhood locality boundaries, and calculate total number of hotspots in neighborhood; 2) remove ineligible unranked crash hotspots from ranking such as hotspots that have been disabled due to errors (e.g., due to anomalies); 3) determine columns with hotspot totals within each rank region that include each crash hotspot, calculate a safety score for each hotspot using weights based on severity of incident (e.g., (a*fatal collisions+b*injury collisions)/traffic, where in some cases a=5 and b=3), and determine an adjustment factor for each hotspot based on what should be promoted or demoted to maximize the safety benefit to the driver. For example a high adjustment factor (e.g., 10) can be used for critical hotspot types such as train crossings and low clearances. A medium adjustment factor (e.g., 5) can be used for standard hotspot types such as fallen objects, pedestrians, and cyclists. A low adjustment factor (e.g., 1) can be used for frequent less critical hotspot types such as intersections, slowing traffic, and parking; 4) determine a rank region column in the table—for example, the rank region column includes the best administrative region/locality for hotspot ranking using known data about density of hotspots, land area, and urban density, etc. to produce the ideal mix of crash hotspots for a user (e.g., NYC is ranked using a country region that maps to the 5 boroughs); urban and rural areas are ranked based on crash hotspot density; in some embodiments, rank regions are dynamically selected and rank regions are selected based on road types; rank regions are determined based on the number of hotspots in the regions (e.g., start with small area like a city, and if not enough hotspots in the city to rank, fall back to county; if not enough in county region to rank, fall back to state, etc.). In various embodiments, the system determines and stores a total land area of the rank region; a stack ranking confidence that distribute hotspots evenly within each rank region; a number of hotspots within each state boundary; a number of hotspots within each county; a number of hotspots within each county sub-region; a number of hotspots within each city locality; a number of hotspots within a zip code locality, or any other appropriate data.

In some embodiments, a stack ranking of hotspots is determined within each group. For example, an adjusted severity score is determined (e.g., hotspot accident severity rate*confidence for stack rank*adjustment for stack rank, where accident severity rate is derived from the crashes per traffic rate at a hotspot locality, a confidence for stack rank is based on how likely the statistical pattern is based on the total number of crashes at the location, and adjustment is based on the trim factor. In some embodiments, hotspots are separated into groups to rank. For example, hotspots are ranked against other hotspots in the same group, where a group is determined by the road type (e.g., highway, city, ramp, etc.), the hotspot type (e.g., the ranking group—for example, intersection, slowing traffic, crash with another vehicle, turn, low clearance, etc.), the ranking region, and the weather conditions (e.g., snow, rain, fog, wind, etc.).

In some embodiments, the ranked hotspots are returned to indicate a new ranking within each locality and group, and low-ranked hotspots are removed using a group cutoff, which estimates the ideal number of density of hotspots within a given locality. For example, if the number of alerts per square mile is greater than certain values then scale with an appropriate factor and evaluate compared to a cutoff. In some embodiments, in response to being below the cutoff, remove the hotspot from the ranked list to create a new ranked list in a region or in a group.

In some embodiments, a final ranking is determined by combining the new region ranked list and the new group ranked list. For example, when calculating the final ranking the rank of a hotspot in a region against all other hotspots regardless of group is combined with the rank of a hotspot in its group. If it ranks highly in either of these buckets, it should rank highly in the final results. This ensures that generically dangerous hotspots in the region as well as hotspots, which are dangerous for a specific reason such as weather (e.g., snow), bubble through with a high rank.

In some embodiments, the crash hotspots are deployed to cloud storage. For example, the hotspots are combined from all states onto a single table, the hotspots are validated for errors, and the hotspots are enriched with metadata used for the ranking. In some embodiments, if an error is detected due to limitations in DOT data or hotspot analysis, then the hotspot will be deactivated. In various embodiments, a DOT data error comprises one or more of the following: a hotspot center that is not located in a state where the crash data originates, a train hotspot that does not occur near a railroad crossing when validated against a map, a low-clearance hotspot that does not occur near a tunnel or bridge crossing when validated against a map, a hotspot with a greater number of duplicate GPS positions than a threshold in DOT data, hotspots with a fewer number of incidents than a threshold due to missing DOT data, a hotspot with an invalid alert type, a hotspot with an alert region that is too short to provide an adequate hazard alert to a driver, a ramp hotspot with unreasonably high crash rates (e.g., due to low traffic volume data and/or estimates), or any other appropriate error circumstance. In various embodiments, hotspot analysis error comprises one or more of the following: a hotspot with unrealistically high crash rate (e.g., a crash rate higher than a threshold, where the threshold is predetermined or based on DOT data—for example, one or two sigma greater than the average crash rate) for the type of road (e.g., a parked car hotspot with unreasonable number of crashes), a hotspot with missing alert regions which could be due to missing road map data, a hotspot with alert region problems (e.g., the hotspot center is not near its alert region, the alert region in an intersection that covers too many intersections—for example, more than one), a hotspot that spans multiple roads where none are connected by an intersection or merge point within the alert region, an intersection hotspot whose diameter extends too far outside of the intersection (e.g., greater than an urban or rural threshold-such as 500 meters and 1000 meters, respectively), or any other appropriate analysis error. In various embodiments, a hotspot error comprises a hotspot with N previous years of no crashes, a hotspot with no predictive value (e.g., falling debris), or any other appropriate hotspot error.

In some embodiments, incident crash locations reported by the DOT are normalized. For example, a DOT reported GPS crash location is moved to a likely crash location comprising detecting that the DOT GPS crash position is in an unlikely location using map data (e.g., a train crash hotspot is moved to a closest railroad crossing, a low-bridge crash is moved to a closest low-bridge, a crash is moved from far outside a road to a pavement area of the closest road, etc.).

In some embodiments, an explore mode table is created of all crash hotspots for visualization in an application. For example, the explore mode table enables the application to search for and visualize hotspots on a map by zoom level using an application interface (e.g., a REST API) by pre-calculating a selection of hotspots to display in each region. This is accomplished by creating a grid of boxes across the country at each zoom level supported by the application. Each box is then populated using the algorithm in a way that balances crash hotspot rank, diversity, and density for the best user experience when viewed on a map using the application. In some embodiments, the system ensures selecting the most relevant hotspots to be shown if many hotspots overlap the same screen space at a high zoom level or a street intersection at the lowest zoom level. In some embodiments, the system promotes low-occurrence hotspots, which enables diversity of hotspot types in each box by promoting under-represented hotspots that would otherwise be out-ranked by more common hotspots (e.g., pedestrian hotspots occur less frequently than slowing traffic hotspots, but visualizing an even distribution of hotspot types across all geographic regions is important for a comprehensive application user experience.

Figure 7:
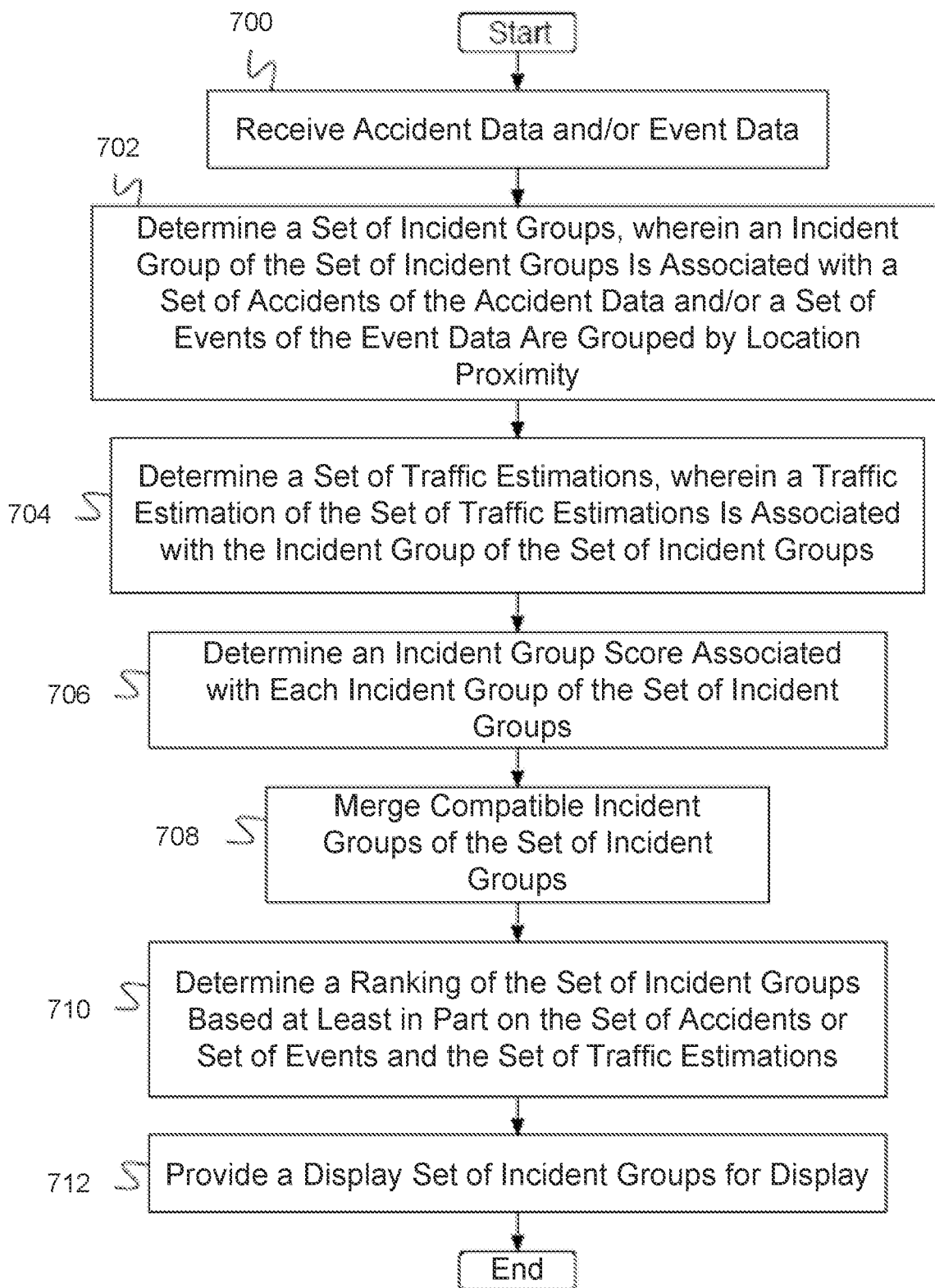
FIG. 7 is a flow diagram illustrating an embodiment of a process for risk ranking using accident and incident information.

FIG. 7 is a flow diagram illustrating an embodiment of a process for risk ranking using accident and incident information. In some embodiments, the process of FIG. 7 is implemented using vehicle data center 200 of FIG. 2. In the example shown, in 700 accident data and/or event data are received. For example, historical accident data and/or vehicle event data are received. In some embodiments, accident data comprises accident data collected by a government organization (e.g., national or state DOT data) or non-governmental organization. In some embodiments, accident data and/or event data include one or more metadata tags. In some embodiments, metadata tags comprise translating object type tags, road type tags, weather tags, geography tags, region tags, or time tags. In some embodiments, event data comprises event data collected by a vehicle event recorder. In various embodiments, event data comprises event data collected by a vehicle event recorder comprises crash data, driver behavior data, maneuver data, vehicle sensor data, or any other appropriate data. In 702, a set of incident groups is determined, where an incident group of the set of incident groups is associated with a set of accidents of the accident data, and/or a set of events of the event data are grouped by location proximity. In some embodiments, determining the set of incident groups is based at least in part on a clustering algorithm. In 704, a set of traffic estimations is determined, where a traffic estimation of the set of traffic estimations is associated with the incident group of the set of incident groups. In some embodiments, a traffic estimation of the set of traffic estimations is based at least in part on traffic count data collected by a government organization, traffic count data collected by a non-governmental organization, or traffic count data determined by a traffic flow computation. In 706, an incident group score associated with each incident group of the set of incident groups is determined. In some embodiments, the incident group score comprises a weighted incident count normalized by traffic flow. In 708, compatible incident groups of the set of incident groups are merged. In 710, a ranking of the set of incident groups is determined based at least in part on the set of accidents or the set of events and/or the set of traffic estimations. In some embodiments, determining the ranking comprises determining an incident group score associated with each incident group, wherein the incident group score is based at least in part on 1) the set of accidents of the accident data associated with the incident group and a set of accident weightings, or 2) the set of events of the event data associated with the incident group and a set of event weightings, and 3) the traffic estimation of the set of traffic estimations associated with the incident group. In some embodiments, a weighting of the set of accident weightings or of the set of event weightings comprises an injury factor, a fatality factor, or a severity factor. In some embodiments, determining the ranking comprises determining a set of rankings, wherein each ranking of the set of rankings is associated with a region. In some embodiments, determining the ranking comprises determining a set of sub-rankings, wherein each sub-ranking of the set of sub-rankings is associated with a region and a condition. In some embodiments, determining the ranking comprises omitting low-ranking incident groups from rankings of the set of rankings and the set of sub-rankings. In 712, a display set of incident groups for display is provided. In some embodiments, a display is provided to display a set of incident groups for display, wherein the display set of incident groups is determined by selecting a top ranked set of incident groups of or from the ranking as the display set of incident groups.

Figure 8:
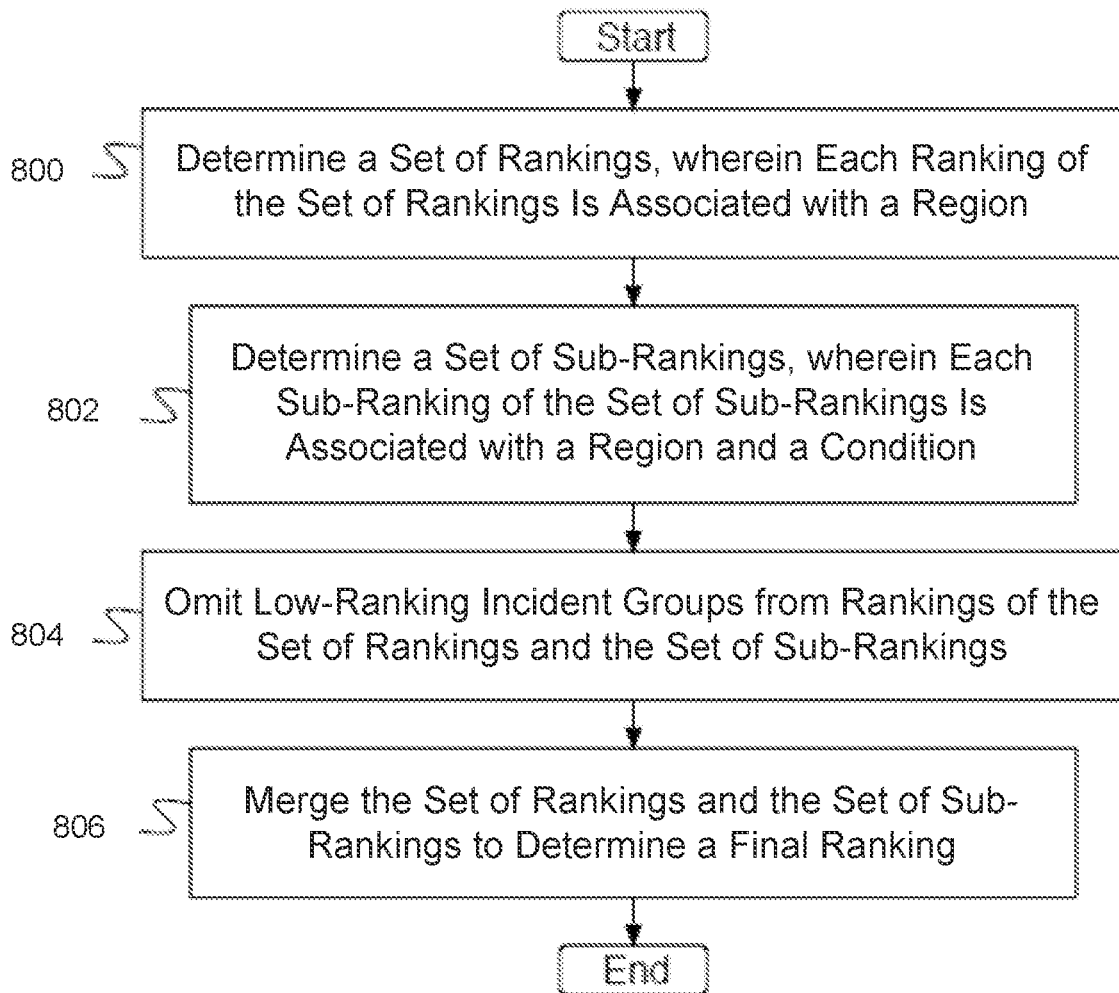
FIG. 8 is a flow diagram illustrating an embodiment of a process for determining a ranking.

FIG. 8 is a flow diagram illustrating an embodiment of a process for determining a ranking. In some embodiments, the process of FIG. 8 is used to implement 710 of FIG. 7. In the example shown, a set of ranking is determined, where each ranking of the set of rankings is associated with a region. In 802, a set of sub-rankings is determined, where each sub-ranking of the set of sub-rankings is associated with a region and a condition. In 804, low-ranking incident groups are omitted from rankings of the set of rankings and the set of sub-rankings. In 806, the set of rankings and the set of sub-rankings are merged to determine a final ranking.

Figure 9:
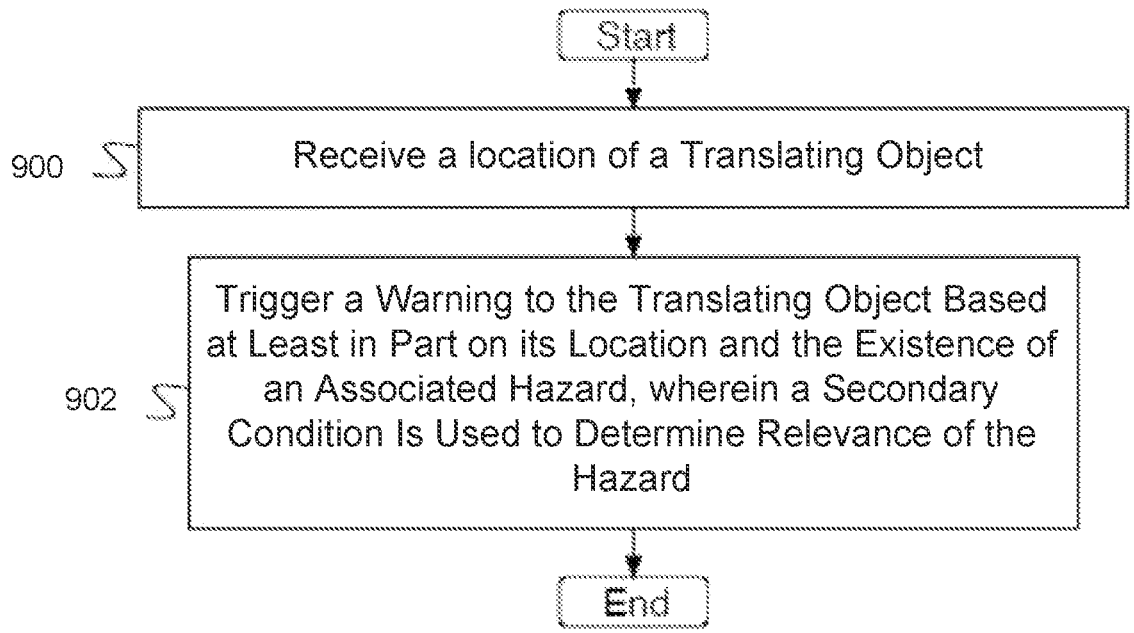
FIG. 9 is a flow diagram illustrating an embodiment of a process for generating alerts with filtering.

FIG. 9 is a flow diagram illustrating an embodiment of a process for generating alerts with filtering. In some embodiments, the process of FIG. 9 is executed by vehicle event recorder 102 of FIG. 1. In the example shown, in 900 a location is received of a translating object. For example, the translating object may be a truck, a car, or another type of vehicle, a cyclist, a pedestrian. In various embodiments, the translating object comprises a bicycle, a scooter, or a person. In 902, a warning is triggered to the translating object based at least in part on its location and the existence of an associated hazard, where a secondary condition is used to determine relevance of the hazard. For example, a warning is triggered when the vehicle is actually approaching the hazard, not simple passing near it. In some embodiments, a warning is triggered for a proximity-only triggered alert using only the radius from the hotspot center and geographic context of the type of surrounding buildings—for example, an "entering school zone" alert type triggers a warning if the vehicle is within a certain radius of a school building and there is also "watch for children" hotspot in proximity. In this example, the driver receives a warning when the vehicle is not necessarily within a known children hotspot. In some embodiments, telemetry regarding the vehicle speed, acceleration, and heading is used to determine whether to activate an alert—for example, if a vehicle is going at a high rate of speed relative to the speed of traffic ahead in a slowing traffic crash hotspot, the driver is alerted as they approach the hotspot. In some embodiments, if the driver is already braking, the alert is suppressed. Another example is that the telemetry from the vehicle heading is used as a filter for the relevant hotspots in the same direction as travel to avoid alerting the driver to hotspots on an overpass that is perpendicular to the vehicles' current heading on a highway below. As yet another example, it can be hard to tell the difference at the beginning of a ramp if the driver is on the ramp or the highway. This is the result of GPS accuracy issues as well as highway widths that overlap with ramp widths. It's also common that the ramp can be in a right lane that is both part of the highway and the ramp. If there is a ramp alert ahead, if the driver slows down and starts turning, the system assumes that the driver is likely getting off at the ramp and will trigger the ramp alert. In some embodiments, the warning is based at least in part on an incident group score, wherein the incident group score is inversely proportional to a traffic flow associated with the location. In some embodiments, the warning is based at least in part on an incident group score, wherein the incident group score is directly proportional to a traffic flow associated with the location. In various embodiments, the secondary condition comprises one or more of the following: a nighttime condition, a seasonal condition, a rush hour condition, a snowy day condition, a rainy day condition, an icy day condition, a fog condition, a dusty condition, a windy weather condition, a highway road type condition, an onramp road type condition, a rural route road type condition, a city street road type condition, or any other appropriate condition or type of condition. In some embodiments, triggering the warning to the translating object based at least in part on its location comprises determining that the location is within an alert region. In some embodiments, the alert region and/or hotspot comprises a geographical region surrounding an incident group. In some embodiments, the alert region and/or hotspot comprises a resolved geographic center point that represents the center within the hotspot geographic region to the user. In some embodiments, the geographic region surrounding an incident group comprises the smallest polygon surrounding the incident group or the smallest convex polygon surrounding the incident group. In some embodiments, the incident group comprises a set of incidents that are grouped based at least in part on an incident location. In some embodiments, when generating the geographical region surrounding an incident group, both the span of crashes in the incident group and the buffer size that needs to be added so that the driver gets a timely alert are examined. As discussed this buffer size is driven by the amount of time desired between when the alert first triggers and the driver passes through the hazard, and this is determined by the hazard or hazard type, speed limit, road geometry, etc.

Figure 10:
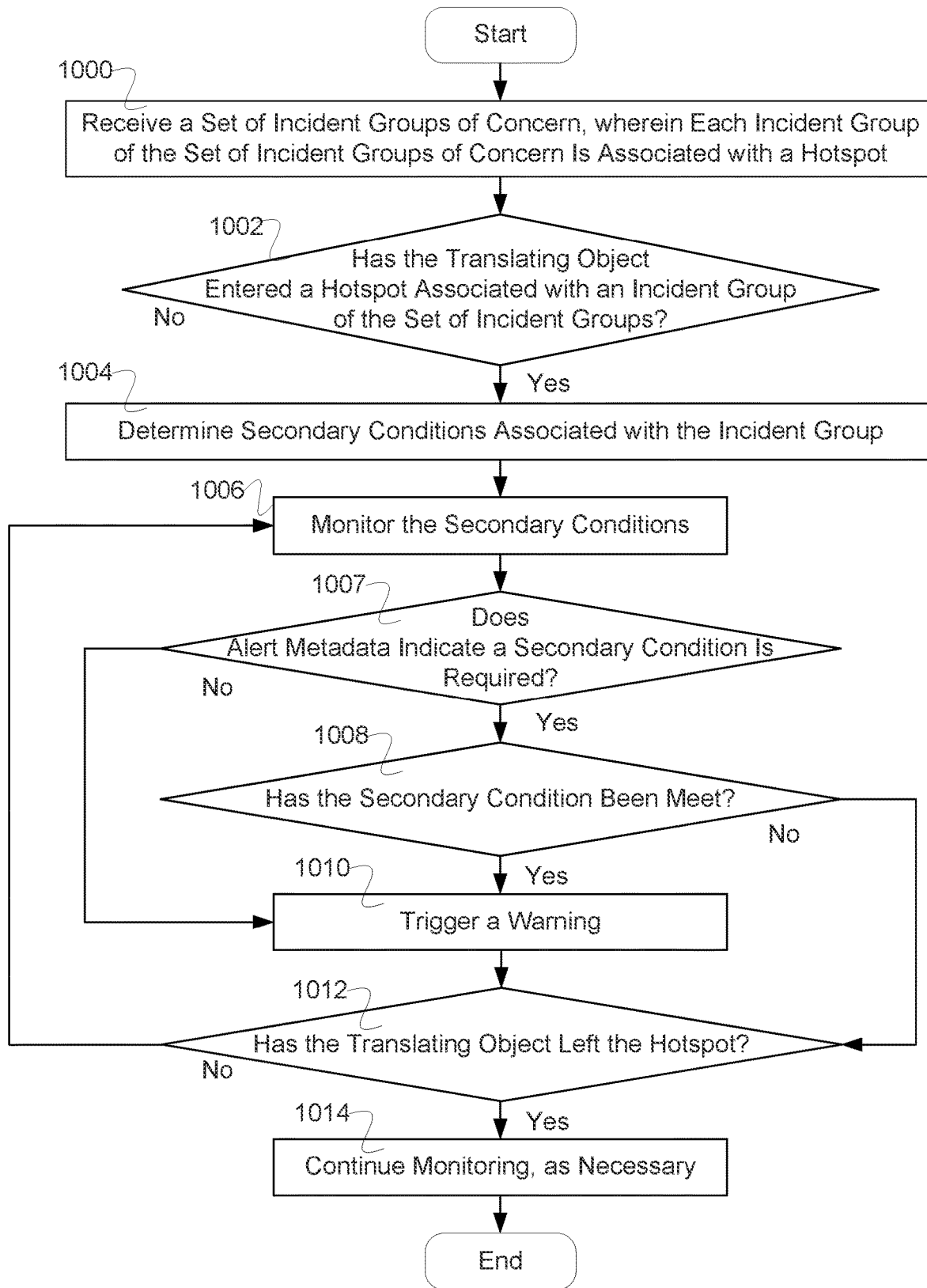
FIG. 10 is a flow diagram illustrating an embodiment of a process for triggering a warning.

FIG. 10 is a flow diagram illustrating an embodiment of a process for triggering a warning. In some embodiments, the process of FIG. 10 is used to implement 902 of FIG. 9. In the example shown, in 1000 a set of incident groups of concern is received, where each incident group of the set of incident groups of concern is associated with a hotspot. In 1002, it is determine whether the translating object has entered a hotspot associated with an incident group of the set of incident groups. In response to determining that the translating object has entered a hotspot associated with an incident group of the set of incident groups, control passes to 1004. In response to determining that the translating object has entered a hotspot associated with an incident group of the set of incident groups, control passes to 1014. In 1004, secondary conditions are determined associated with the incident group. In 1006, the secondary conditions are monitored. In 1007, it is determined whether alert metadata indicates a secondary condition is required. In response to determining that an alert metadata indicates a secondary condition is required, control passes to 1008. In response to determining that an alert metadata does not indicate a secondary condition is required, control passes to 1010. In 1008, it is determined whether a secondary condition has been met. For example, it is determined whether a period of time has passed since the last warning was triggered (e.g., the secondary condition comprises whether the period of time has passed since a last warning). In some embodiments, a warning is not issued within a period to not over alert a driver. In some embodiments, not over alerting a driver is handled by an auto-quieting system. In various embodiments, a period for not warning comprises a fixed period (e.g., 2 seconds, 4 seconds, 10 seconds, 1 minute, etc.), a variable period (e.g., 2 seconds after a first alert, 4 seconds after a second alert, etc.), or any other appropriate period. In response to the secondary condition having been met, control passes to 1010. In response to the secondary condition having not been met, control passes to 1012. In 1010, a warning is triggered. In 1012, it is determined whether the translating object has left the hotspot. In response to determining that the translating object has left the hotspot, control passes to 1014. In response to determining that the translating object has not left the hotspot, control passes to 1006. In 1014, monitoring continues as necessary, and the process ends.

In some embodiments, an auto-quieting system prevents a driver from getting the same exact alert over and over in a short span of time when the driver is driving on the same road. The system auto-quiets based at least in part on historical data (e.g., the type of the alert, the time you received that alert, and whether you've turned on to a different road since you received that alert). In some embodiments, before playing audio for an alert the auto-quieting algorithm compares the current time to the last time this alert type was shown to the driver. If this same alert type was shown a short time before (e.g., within the last minute) auto-quieting suppresses the voice read-out of the alert. In some embodiments, certain alert types such as sharp turns are never subject to auto-quieting. In some embodiments, if the driver received a slowing traffic alert on Road A and then turned on to Road B where another slowing traffic alert triggered, auto-quieting would not quiet the alert because it occurred on a new road.

Figure 11:
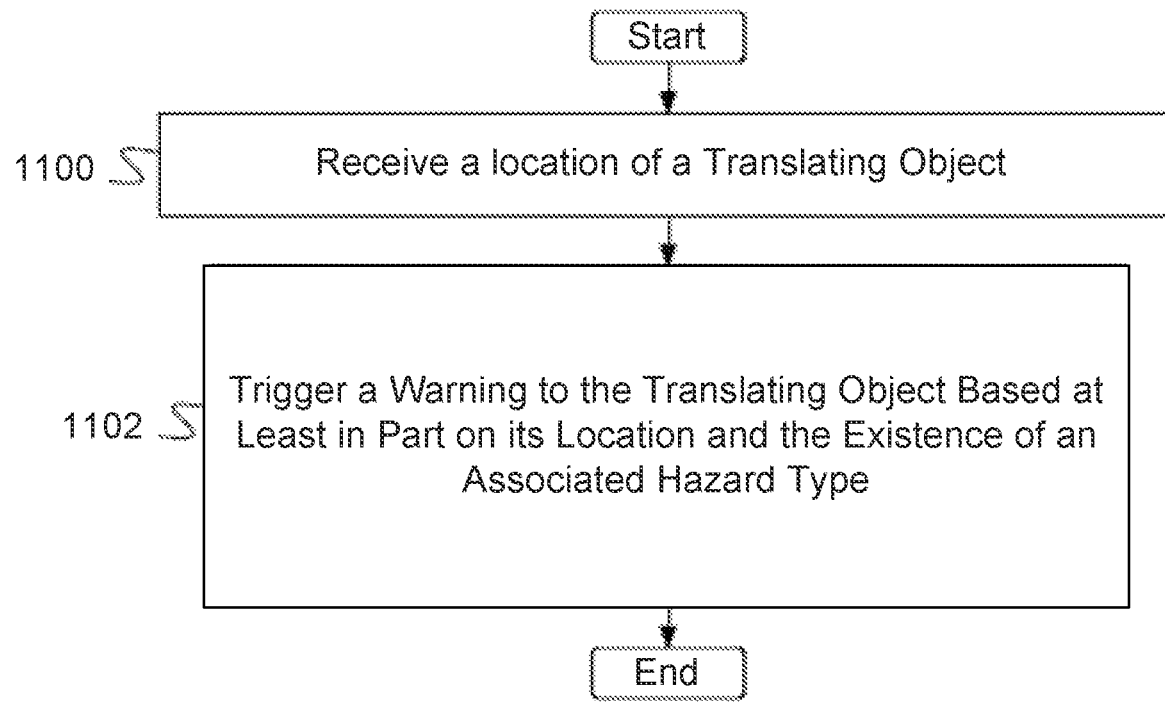
FIG. 11 is a flow diagram illustrating an embodiment of a process for generating alerts with filtering.

FIG. 11 is a flow diagram illustrating an embodiment of a process for generating alerts with filtering. In some embodiments, the process of FIG. 11 is implemented by vehicle event recorder 102 of FIG. 1. In the example shown, in 1100 a location of a translating object is received. In various embodiments, a translating object comprises a truck, a vehicle, a cyclist, a pedestrian, or any other appropriate moving object. In 1102, a warning to the translating object is triggered based at least in part on its location and the existence of an associated hazard or hazard type. For example, a warning is generated when a driver is a number of seconds from reaching a hazard (e.g., a hotspot, a crash location, an accident location, an incident location, etc.). In various embodiments, a hazard or hazard type (e.g., a low bridge, merging traffic, slowing traffic, turn, intersection, train, steep hill, falling rocks, pedestrian, bicyclist, animal, etc.) determines the number of seconds prior to reaching the hazard when the warning is issued to the driver. In some embodiments, the timing to show the alert (how far in advance) comes from the server and is determined by the size of the alert region. In some embodiments, the alert region is calculated based on the alert type, road speed limit, and road geometry. In some embodiments, a timing associated with the warning is adjusted based at least in part on a secondary condition distinct from the associated hazard or hazard type. In some embodiments, the system reduces false positive alerts by determining if the vehicle is currently on a heading and path that will likely enter the hotspot alert region as opposed to driving parallel to or turning away before entering the hotspot. In various embodiments, the secondary condition comprises one or more of the following: a speed condition, a terrain condition, a tunnel condition, an environmental condition, a road direction condition, a road curvature condition, a road profile condition, or any other appropriate condition. In some embodiments, triggering the warning to the translating object based at least in part on its location comprises determining whether the location is within a hotspot or an alert region. In some embodiments, determining whether the location is within the hotspot or alert region comprises determining whether the location is within any part of the hotspot or alert region, whether the location is in the leading half of the hotspot or alert region, whether the location is in the trailing half of the hotspot or alert region, or whether the location is near the center of the hotspot or alert region. In some embodiments, adjusting the timing associated with the warning comprises displaying the warning at an earlier time then it would otherwise be displayed. In some embodiments, adjusting the timing associated with the warning comprises displaying the warning until a later time then it would otherwise be displayed. In some embodiments, adjusting the timing associated with the warning comprises displaying the warning until the secondary condition is met. In some embodiments, adjusting the timing associated with the warning comprises not displaying the warning.

In some embodiments, the timing to show the alert (e.g., how far in advance to show the alert) comes from the server and is in fact defined by the size of the region that is sent. The size of the region is calculated based on the alert type, road speed limit, and road geometry. In some embodiments, real-time data (e.g., weather data, traffic data, etc.) is used to adjust this timing value and/or the alert region size.

In some embodiments, there are dynamic parameters passed along with the alert information that the client device uses to determine if it should trigger the alert. This includes valid approach angles (i.e., the heading of the road), whether the road is one-way or two-way, what the minimum and maximum speeds are for triggering, whether the hazard represents a point (like a low bridge) or a region (like for merging traffic), under what traffic conditions the alert should be triggered, and whether the alert should only be triggered under particular weather conditions. In some embodiments, the approach angles are used to determine if the vehicle is headed in a direction that matches the road direction. This prevents false triggers where the vehicle is passing near the hazard (e.g., on a cross-street through the hazard region) but is not actually headed to the hazard itself. The minimum speed to trigger is used in curves, if a driver is going at a safe speed approaching the curve, the system does not trigger the alert, only when the driver is driving too fast is the alert triggered. The maximum speed to trigger is used on slowing traffic hazards. If the traffic is flowing freely (e.g., near the speed limit) then the system does not meet the crowded conditions that create crashes, and the alert is not triggered.

Figure 12:
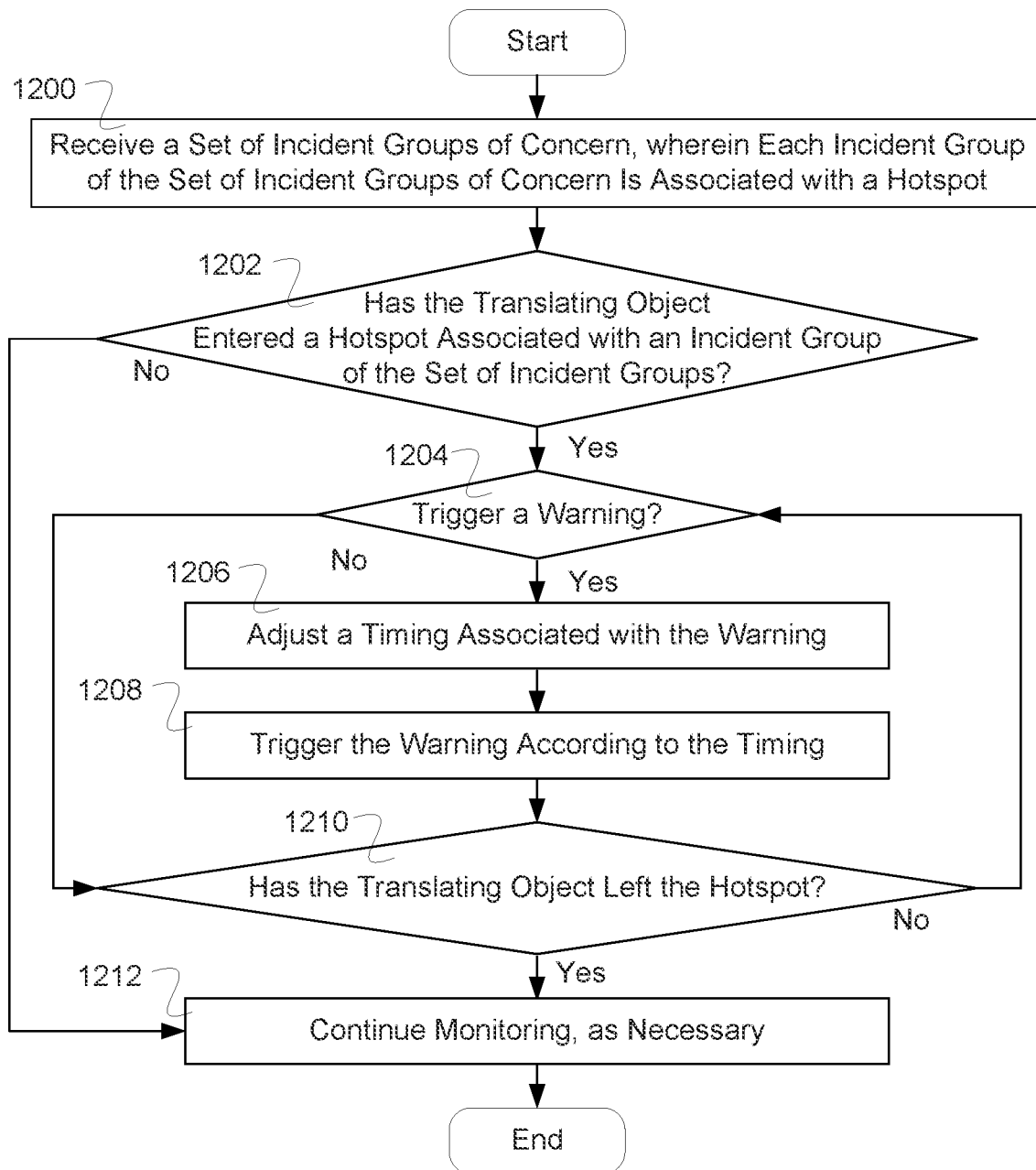
FIG. 12 is a flow diagram illustrating an embodiment of a process for triggering a warning.

FIG. 12 is a flow diagram illustrating an embodiment of a process for triggering a warning. In some embodiments, the process of FIG. 12 is used to implement 1102 of FIG. 11. In the example shown, in 1200 a set of incident groups of concern is received, where each incident group of the set of incident groups of concern is associated with a hotspot. In 1202, it is determined whether the translating object has entered a hotspot associated with an incident group of the set of incident groups. In response to determining that the translating object has entered a hotspot associated with an incident group of the set of incident groups, control passes to 1204. In response to determining that the translating object has not entered a hotspot associated with an incident group of the set of incident groups, control passes to 1212. In 1204, it is determined whether a warning is triggered. In response to a warning being triggered, control passes to 1206. In response to a warning not being triggered, control passes to 1210. In 1206, a timing is adjusted associated with the warning. In some embodiments, the timing is adjusted associated with the warning based at least in part on a secondary condition. In 1208, the warning is triggered according to the timing. In 1210, it is determined whether the translating object has left the hotspot. In response to determining that the object has left the hotspot, control passes to 1212. In response to determining that the object has not left the hotspot, control passes to 1204. In 1212, monitoring is continued as necessary, and the process ends.

Figure 13:
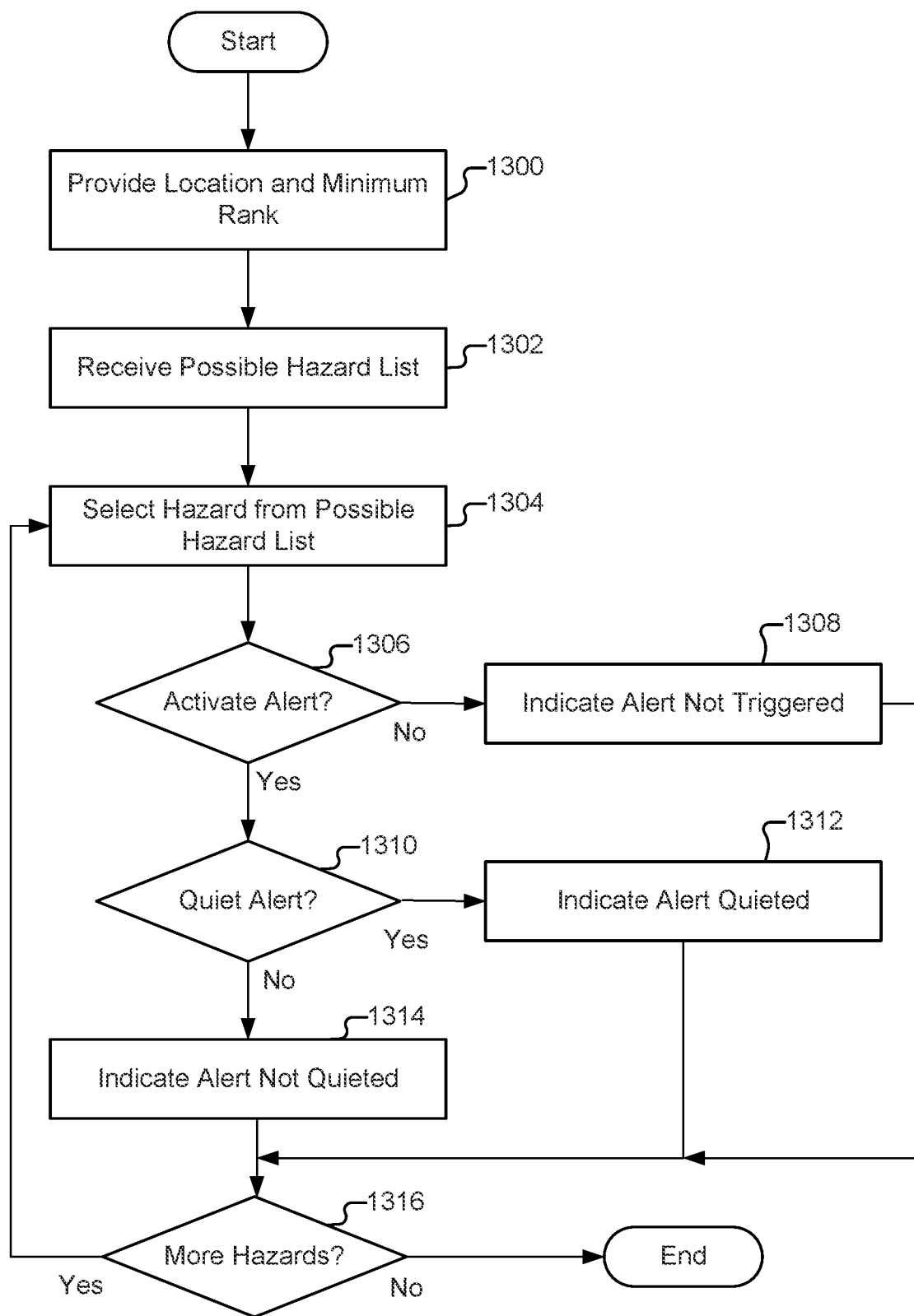
FIG. 13 is a flow diagram illustrating an embodiment for hazard alerting.

FIG. 13 is a flow diagram illustrating an embodiment for hazard alerting. In some embodiments, the process of FIG. 13 is implemented by vehicle event recorder 102 of FIG. 1. In the example shown, in 1300 a location and minimum rank is provided. For example, a client device (e.g., a vehicle event recorder, a mobile phone, a tablet, etc.) provides a server with a location and a minimum hazard rank. In 1302, a possible list of hazards is received. For example, the server uses the location, time of day, day of year, minimum hazard rank, roadway, heading, distance, desired alert types, etc. to filter down the list of all possible hazards to only those that are relevant, and this list is received by the client device. For each hazard the server includes conditional properties that the client device can use to determine whether or not the alert should be activated. In 1304, a hazard is selected from the possible hazard list. In 1306, it is determined whether an alert should be activated. For example, when a driver approaches a hazard sent by the server (as defined by the vehicle entering the alert region for the hazard), the client looks to see if it should activate the alert for that hazard. It checks the conditions (properties) sent from the server that are required to activate the alert for the hazard. The conditions fall under two categories, behavioral, and environmental. Behavioral conditions are monitored by vehicle telemetry and include things like minimum speed for alert, maximum speed for alert, whether the vehicle is on the right approach angle, whether the vehicle is turning, braking, etc. For example, if a vehicle is already braking it makes no sense to trigger the slowing traffic ahead alert. In some embodiments, environmental conditions include weather and traffic. For example, if the hazard is only relevant in the snow, then the alert for the hazard should only be triggered if it is snowing. The client device fetches live weather and traffic data and compares against the alert conditions for the hazard sent by the server. The end result of this is the client determines whether the alert for the hazard should be activated. In response to determining that the alert should not be activated, in 1308 it is indicated that the alert is not triggered and control passes to 1316. In response to determining that the alert should be activated, in 1310 it is determined whether the alert is to be quieted. For example, it is determined whether the driver is getting too many of the same alerts. In response to determining that the alert is to be quieted, in 1312 it is indicated that the alert is to be quieted, and control passes to 1316. For example, the alert is saved or only displayed as text or as an icon but not in audio form. In response to determining that the alert is not to be quieted, in 1314 it is indicated that the alert is not to be quieted, and control passes to 1316. For example, the alert is provided in audio form and/or in icon form and/or in text form or any other appropriate manner. In 1316, it is determined whether there are more hazards. For example, there are more hazards to process from the possible hazard list. In response to there being more hazards, control passes to 1304. In response to there not being more hazards, the process ends.

In some embodiments, this separation of where the conditional testing is performed could be performed on the server. For example, in the case of a vehicle event recorder as the client device, which may not have the computing resources of a mobile phone or tablet device, the environmental filter (e.g., weather, traffic) may be done on the server, not the client. The behavioral filter is likely still going to be done on the client device because it requires real-time telemetry information about the vehicle's speed, position, heading, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating a transportation alert, comprising:
   an interface configured to receive a location of a translating object; and
   a processor configured to:
   trigger a warning to the translating object based at least in part on the location of the translating object and an existence of an associated hazard;
   receive a timing associated with the warning for displaying the warning, wherein the timing is based at least in part on a predetermined time period from the translating object reaching the associated hazard; and
   adjust the timing to an adjusted timing based on a secondary condition distinct from the associated hazard.

2. The system of claim 1, wherein the translating object comprises a truck or a car.

3. The system of claim 2, wherein the warning is based at least in part on an incident group score, wherein the incident group score is inversely proportional to a traffic flow associated with the location.

4. The system of claim 1, wherein the translating object comprises a bicycle, a scooter, or a person.

5. The system of claim 4, wherein the warning is based at least in part on an incident group score, wherein the incident group score is directly proportional to a traffic flow associated with the location.

6. The system of claim 1, wherein the secondary condition comprises a nighttime condition.

7. The system of claim 1, wherein the secondary condition comprises a seasonal condition.

8. The system of claim 1, wherein the secondary condition comprises a rush hour condition.

9. The system of claim 1, wherein the secondary condition comprises a snowy day condition.

10. The system of claim 1, wherein the secondary condition comprises a rainy day condition.

11. The system of claim 1, wherein the secondary condition comprises one or more of an icy day condition, a fog condition, a dusty condition, or a windy weather condition.

12. The system of claim 1, wherein the secondary condition comprises a highway road type condition.

13. The system of claim 1, wherein the secondary condition comprises a ramp road type condition.

14. The system of claim 1, wherein the secondary condition comprises a city street road type condition.

15. The system of claim 1, wherein the secondary condition comprises a rural route road type condition.

16. The system of claim 1, wherein triggering the warning to the translating object comprises determining that the location is within a hotspot.

17. The system of claim 16, wherein the hotspot comprises a geographical region surrounding an incident group and a resolved geographic center point.

18. The system of claim 17, wherein the geographic region surrounding the incident group comprises a smallest polygon surrounding the incident group or a smallest convex polygon surrounding the incident group.

19. The system of claim 17, wherein the incident group comprises a set of incidents that are grouped based at least in part on an incident location.

20. A method for generating a transportation alert, comprising:
    receiving a location of a translating object;
    triggering, using a processor, a warning to the translating object based at least in part on the location and an existence of an associated hazard;
    receiving a timing associated with the warning for displaying the warning, wherein the timing is based at least in part on a predetermined time period from the translating object reaching the associated hazard; and
    adjusting the timing to an adjusted timing based on a secondary condition distinct from the associated hazard.

21. A computer program product for generating a transportation alert, the computer program product being embodied in a non-transitory computer readable storage medium and comprising computer instructions for:
    receiving a location of a translating object;
    triggering a warning to the translating object based at least in part on the location and an existence of an associated hazard;
    receiving a timing associated with the warning for displaying the warning, wherein the timing is based at least in part on a predetermined time period from the translating object reaching the associated hazard; and
    adjusting the timing to an adjusted timing based on a secondary condition distinct from the associated hazard.

22. The system of claim 1, wherein the secondary condition comprises a speed limit, a road geometry, a vehicle velocity, an approach heading/angle, an intersection type, a weather information, a real-time weather information, a traffic information, a speed condition, a terrain condition, a tunnel condition, an environmental condition, a road direction condition, a road curvature condition, a road slope condition, and a road profile condition.

23. The system of claim 1, wherein the processor is further configured to determine whether the predetermined time period from the translating object reaching the associated hazard has been met.

24. The system of claim 1, wherein the processor is further configured to determine whether the secondary condition distinct from the associated hazard has been met.

25. The system of claim 1, wherein adjusting the timing causes one of the warning to be displayed at an earlier time, the warning to be displayed at a later time, the warning to be displayed until the secondary condition is met, and the warning not to be displayed.

* * * * *